(12) United States Patent
Satake et al.

(10) Patent No.: US 10,989,849 B2
(45) Date of Patent: Apr. 27, 2021

(54) OPTICAL LAMINATE

(71) Applicant: FUJIFILM CORPORATION, Tokyo (JP)

(72) Inventors: Ryo Satake, Kanagawa (JP); Yukito Saitoh, Kanagawa (JP); Daisuke Kashiwagi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 326 days.

(21) Appl. No.: 16/253,209

(22) Filed: Jan. 21, 2019

(65) Prior Publication Data

US 2019/0154895 A1    May 23, 2019

Related U.S. Application Data

(63) Continuation of application No. PCT/JP2017/031035, filed on Aug. 29, 2017.

(30) Foreign Application Priority Data

Aug. 30, 2016 (JP) .............................. JP2016-167561
May 18, 2017 (JP) .............................. JP2017-099352

(51) Int. Cl.
*G02B 5/28* (2006.01)
*G02F 1/1335* (2006.01)
(Continued)

(52) U.S. Cl.
CPC ............ *G02B 5/285* (2013.01); *G02B 5/1814* (2013.01); *G02B 5/201* (2013.01); *G02B 5/26* (2013.01);
(Continued)

(58) Field of Classification Search
CPC ........ G02B 5/285; G02B 5/26; G02B 5/1814; G02B 5/3016; G02B 5/201; G02B 5/3083; G02F 1/1335
See application file for complete search history.

(56) References Cited

U.S. PATENT DOCUMENTS

2005/0174511 A1* 8/2005 Sugawara ......... G02F 1/133555
349/106
2007/0188678 A1  8/2007 Kim et al.
(Continued)

FOREIGN PATENT DOCUMENTS

JP    2003-139942 A    5/2003
JP    2007-98942 A     4/2007
(Continued)

OTHER PUBLICATIONS

International Search Report issued in International Application No. PCT/JP2017/031035 dated Nov. 21, 2017.
(Continued)

*Primary Examiner* — Wen Huang
(74) *Attorney, Agent, or Firm* — Solaris Intellectual Property Group, PLLC

(57) ABSTRACT

An optical laminate includes a wavelength selective reflective element, and an absolute phase adjustment layer which is provided on at least one surface side of the wavelength selective reflective element and has optical isotropy, and in which a first region having a first optical path length and a second region having a second optical path length different from the first optical path length are arranged in a pattern with a diffraction grating-like period. The optical laminate reflects light in the specific reflection wavelength region by the wavelength selective reflective element, of light incident from the absolute phase adjustment layer side. In the optical laminate, light which enters the first region of the absolute phase adjustment layer and is reflected by the wavelength selective reflective element and light which enters the second region and is reflected by the wavelength selective reflective element interfere with each other.

13 Claims, 8 Drawing Sheets

(51) Int. Cl.
   *G02B 5/26*     (2006.01)
   *G02B 5/18*     (2006.01)
   *G02B 5/30*     (2006.01)
   *G02B 5/20*     (2006.01)

(52) U.S. Cl.
   CPC ......... *G02B 5/3016* (2013.01); *G02F 1/1335* (2013.01); *G02B 5/3083* (2013.01)

(56) References Cited

U.S. PATENT DOCUMENTS

| | | |
|---|---|---|
| 2009/0104539 A1 | 4/2009 | Watanabe et al. |
| 2009/0128772 A1 | 5/2009 | Hoshino et al. |
| 2012/0068450 A1* | 3/2012 | Macpherson ........ B42D 25/387 283/70 |
| 2017/0059754 A1* | 3/2017 | Frey ....................... G02B 5/288 |

FOREIGN PATENT DOCUMENTS

| | | | |
|---|---|---|---|
| JP | 2007-219527 A | 8/2007 | |
| JP | 2007-279129 A | 10/2007 | |
| JP | 2011-102843 A | 5/2011 | |

OTHER PUBLICATIONS

Written Opinion of the ISA issued in International Application No. PCT/JP2017/031035 dated Nov. 21, 2017.

English language translation of the following: Office action dated Oct. 29, 2019 from the JPO in a Japanese patent application No. 2018-537316 corresponding to the instant patent application.

* cited by examiner

OPTICAL LAMINATE

CROSS-REFERENCE TO RELATED APPLICATIONS

This application is a continuation application of International Application No. PCT/JP2017/031035, filed Aug. 29, 2017, the disclosure of which is incorporated herein by reference in its entirety. Further, this application claims priority from Japanese Patent Application No. 2016-167561, filed Aug. 30, 2016, and Japanese Patent Application No. 2017-099352, filed May 18, 2017, the disclosures of which are incorporated herein by reference in their entirety.

BACKGROUND OF THE INVENTION

1. Field of the Invention

The present invention relates to an optical laminate provided with a wavelength selective reflective element.

2. Description of the Related Art

Wavelength selective reflective elements selectively reflecting light in a specific wavelength region have been known.

A cholesteric liquid crystal which is a type of wavelength selective reflective element has a property of selectively reflecting specific circularly polarized light of a specific wavelength and transmitting other wavelengths and other circularly polarized light, and is used for a color filter or a brightness enhancement film of a display device.

In addition, a technology of using a cholesteric liquid crystal layer as an identification medium has also been known (JP2007-279129A, JP2011-102843A, etc.). JP2007-279129A and JP2011-102843A disclose an identification medium which is provided with: a cholesteric liquid crystal layer having a hologram layer including hologram images for left and right eyes; and a λ/2 plate provided to have a predetermined pattern on the cholesteric liquid crystal layer.

SUMMARY OF THE INVENTION

The cholesteric liquid crystal layer selectively reflects light of a wavelength corresponding to the period of the helical structure of the liquid crystal, but the selective reflection wavelength thereof varies depending on the incidence angle of light. Specifically, in the cholesteric liquid crystal layer, the selective reflection wavelength in a case where light is made incident from an oblique direction shifts to a shorter wavelength side than the selective reflection wavelength in a case where light is made incident from the front direction. For example, an object looking green from the front side looks blue from an oblique direction. This short wavelength shift phenomenon does not occur only in the cholesteric liquid crystal layer, but in any wavelength selective reflective element.

The invention is contrived in view of the circumstances, and an object thereof is to provide an optical laminate in which wavelength shift depending on a viewing angle in a wavelength selective reflective element is suppressed.

A first optical laminate according to the embodiment of the invention, comprising: a wavelength selective reflective element which is provided with a reflection layer selectively reflecting light in a specific reflection wavelength region; and an absolute phase adjustment layer which is provided on at least one surface side of the wavelength selective reflective element and has optical isotropy, and in which a first region having a first optical path length and a second region having a second optical path length different from the first optical path length are arranged in a pattern with a diffraction grating-like period, in which the optical laminate reflects light in the specific reflection wavelength region by the wavelength selective reflective element, of light incident from the absolute phase adjustment layer side, and light which enters the first region and is reflected by the wavelength selective reflective element and light which enters the second region and is reflected by the wavelength selective reflective element interfere with each other.

In the first optical laminate according to the embodiment of the invention, the reflection layer of the wavelength selective reflective element may be a cholesteric liquid crystal layer.

In the first optical laminate according to the embodiment of the invention, the reflection layer of the wavelength selective reflective element may be a dielectric multilayer film in which at least two layers having different refractive indices are alternately laminated in multiple layers.

In the first optical laminate according to the embodiment of the invention, the first optical path length and the second optical path length can be made different by making the first region and the second region of the absolute phase adjustment layer different from each other in at least one of a refractive index or a film thickness.

In the first optical laminate according to the embodiment of the invention, an optical path length difference between the first optical path length and the second optical path length is preferably $0.27\lambda$ to $0.45\lambda$ where $\lambda$ is a central wavelength of the specific reflection wavelength region.

Here, the first optical path length is the product of the film thickness and the refractive index of the first region, and the second optical path length is the product of the film thickness and the refractive index of the second region.

In the first optical laminate according to the embodiment of the invention, the period of the arrangement pattern of the first region and the second region is preferably 0.6 µm to 2.0 µm.

In the first optical laminate according to the embodiment of the invention, the first region preferably has a refractive index of 1.4 to 1.6, and the second region preferably has a refractive index of 1.8 to 2.0.

In the first optical laminate according to the embodiment of the invention, a diffusion plate may be provided on a surface side of the absolute phase adjustment layer, opposed to a surface on which the wavelength selective reflective element is disposed.

In the first optical laminate according to the embodiment of the invention, the first region and the second region may have the same stripe shape, and may be alternately arranged in a width direction of the stripe shape.

In the first optical laminate according to the embodiment of the invention, the first region and the second region may have the same rectangular shape, and may be alternately arranged in horizontal and vertical directions.

In the first optical laminate according to the embodiment of the invention, the absolute phase adjustment layer may be provided with a third region having a third optical path length between the first optical path length and the second optical path length, and the third region may be arranged together with the first region and the second region in the pattern with the period.

In the first optical laminate according to the embodiment of the invention, in the wavelength selective reflective element, two or more reflection layers having different reflection wavelength regions may be arranged in a pattern with a larger period than the period of the first region and the second region.

In the first optical laminate according to the embodiment of the invention, the wavelength selective reflective element may be formed by laminating two or more reflection layers having different reflection wavelength regions.

A second optical laminate according to the embodiment of the invention is formed by laminating the first optical laminate according to the embodiment of the invention in multiple layers.

The first and second optical laminates according to the embodiment of the invention have: a wavelength selective reflective element which is provided with a reflection layer selectively reflecting light in a specific reflection wavelength region; and an absolute phase adjustment layer which is provided on at least one surface side of the wavelength selective reflective element and has optical isotropy, and in which a first region having a first optical path length and a second region having a second optical path length different from the first optical path length are arranged in a pattern with a diffraction grating-like period, in which the optical laminate reflects light in the specific reflection wavelength region by the wavelength selective reflective element, of light incident from the absolute phase adjustment layer side, and light which enters the first region and is reflected by the wavelength selective reflective element and light which enters the second region and is reflected by the wavelength selective reflective element interfere with each other. It becomes possible to output only a specific wavelength, and thus it is possible to suppress wavelength shift during visual recognition from a direction oblique to a normal line of the optical laminate.

DESCRIPTION OF THE PREFERRED EMBODIMENTS

Figure 1:
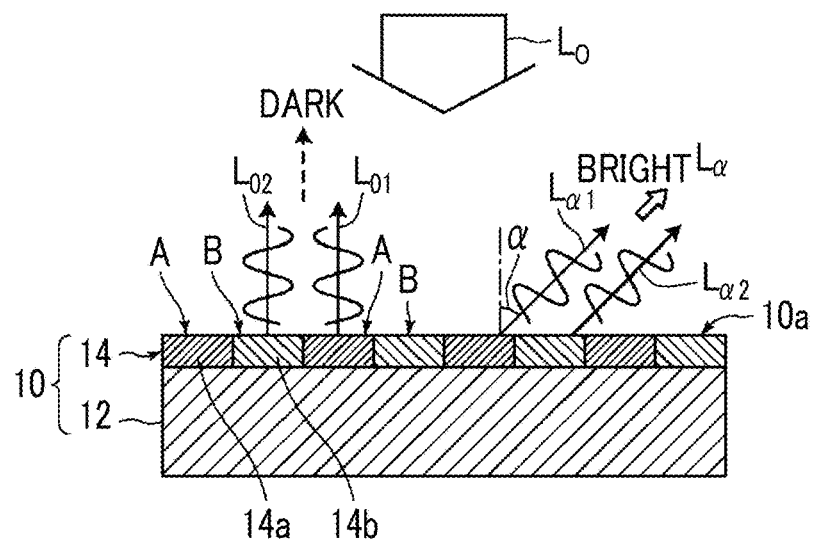
FIG. 1 is a schematic cross-sectional view showing an optical laminate according to a first embodiment.

Hereinafter, embodiments of an optical laminate of the invention will be described with reference to the drawings. In the drawings, the scales of the constituent elements are appropriately changed from the actual ones in order to make them easier to see.

<Optical Laminate>

Optical laminates according to first to fourth and sixth embodiments to be described below are embodiments of a first optical laminate according to the embodiment of the invention, and an optical laminate according to a fifth embodiment is an embodiment of a second optical laminate according to the embodiment of the invention.

FIG. 1 is a schematic cross-sectional view of an optical laminate 10 according to a first embodiment of the invention.

The optical laminate 10 according to this embodiment includes a wavelength selective reflective element 12 which is provided with a reflection layer reflecting light in a specific reflection wavelength region, and an absolute phase adjustment layer 14 which is provided on at least one surface side of the wavelength selective reflective element 12, and in which a first region A having a first optical path length and a second region B having a second optical path length different from the first optical path length are arranged in a pattern with a diffraction grating-like period. The absolute phase adjustment layer 14 has optical isotropy. In a case where incident light and reflected light pass through the first and second regions, the absolute phase adjustment layer does not affect the polarization state of the light passing through them. In this embodiment, the wavelength selective reflective element 12 is formed only of the reflection layer, and the reflection layer is a cholesteric liquid crystal layer. Therefore, the optical laminate 10 reflects the circularly polarized light component in a selected wavelength region by the cholesteric liquid crystal layer, of the light incident from the absolute phase adjustment layer 14. Here, the circularly polarized light component is either a right-handed circularly polarized light component or a left-handed circularly polarized light component, and the direction of the helix of the cholesteric liquid crystal layer determines which one will be reflected.

In this embodiment, the cholesteric liquid crystal layer constituting the wavelength selective reflective element 12 is a liquid crystal phase in which molecules of a rod-like liquid crystal compound or a disk-like liquid crystal compound are helically arranged. The reflection wavelength region can be adjusted by changing the pitch or the refractive index of the helical structure in the above cholesteric liquid crystal phase. The pitch of the helical structure can be easily adjusted by changing the amount of a chiral agent to be added.

Although the absolute phase adjustment layer 14 has optical isotropy, a change in polarization state is allowed within such a range that the interference of reflected light is not affected in the absolute phase adjustment layer 14, and thus the absolute phase adjustment layer is allowed to have anisotropy within the above range.

The diffraction grating-like period means a period with which light components which enter the two regions A and B, and are reflected and emitted can interfere with each other. A general diffraction grating period is about 0.2 µm to 30 µm. In the invention, the diffraction grating period is preferably about 0.4 µm to 3.0 µm, more preferably about 0.6 µm to 2.0 µm, and particularly preferably 1.0 µm to 2.0 µm.

The wavelength selective reflective element 12 which exhibits specular reflection of incident light normally reflects incident light (hereinafter, front incident light), which is incident perpendicular to a normal direction, in the normal direction, and reflects incident light, which is incident at an incidence angle θ, at a reflection angle θ. However, the optical laminate 10 is provided with the absolute phase adjustment layer 14 on the incidence surface side of the wavelength selective reflective element 12, and the first region A and the second region B are arranged with a diffraction grating-like period. In the optical laminate 10, since the absolute phase adjustment layer 14 is provided, a difference is generated in absolute phase between light which enters the first region A of the absolute phase adjustment layer 14 and is reflected by the wavelength selective reflective element 12 and light which enters the second region B and is reflected by the wavelength selective reflective element 12, of incident light $L_0$ incident from a surface 10a of the optical laminate 10 on the side of the absolute phase adjustment layer 14. Due to the interference between two light components which are different in absolute phase from each other, the reflected light is strengthened or weakened according to the emission direction (reflection angle) thereof. As a result, the incident light is reflected at an angle different from the specular reflection direction of the incident light. The principle thereof will be described below.

As schematically shown in FIG. 1 in a simplified manner, in a case where the phase adjustment layer performs adjustment such that phases of first reflected light $L_{01}$ and second reflected light $L_{02}$ in a direction along the normal line of the surface 10a (hereinafter, referred to as normal direction) from the side of the absolute phase adjustment layer 14 of the optical laminate 10 are shifted by, for example, π, the reflected light $L_{01}$ and the reflected light $L_{02}$ in the normal direction cancel each other, and as a result, the reflected light in the normal direction becomes dark. On the other hand, phases of first reflected light $L_{\alpha1}$ and second reflected light $L_{\alpha2}$ of light emitted in a direction inclined by a from the normal direction of the surface coincide with each other, and the reflected light is strengthened. Accordingly, the reflected light in that direction becomes bright as a whole. The optical laminate according to this embodiment has a configuration utilizing this principle. The reflection angle at which the first reflected light and the second reflected light of incident light are weakened and the reflection angle at which the first reflected light and the second reflected light of incident light are strengthened are determined by an optical path length difference between the first region A and the second region B of the absolute phase adjustment layer 14 and an arrangement period of the regions. As a result, the incident light is reflected at an angle different from the specular reflection direction of the incident light.

Since it is possible to restrict a color which is observed as reflected light as a result of the above interference, the optical laminate functions as an optical laminate capable of suppressing short wavelength shift in a case where the incidence angle of light is increased, as compared to a conventional case where only the wavelength selective reflective element 12 is provided without the absolute phase adjustment layer.

As described above, the selected wavelength region of the wavelength selective reflective element is determined by the period of the helical structure and the refractive index of the cholesteric liquid crystal. In this case, the selected wavelength region in the cholesteric liquid crystal generally means the wavelength region of light reflected in the normal direction of the surface of the wavelength selective reflective element. In the optical laminate according to the embodiment of the invention, setting may be performed such that the reflection wavelength at which the light is strengthened is adjusted to a desired wavelength.

The optical path length of the first region is defined as the product of a refractive index $n_1$ and a film thickness $d_1$ of the first region, and the optical path length of the second region is defined as the product of a refractive index $n_2$ and a film thickness $d_2$ of the second region.

The optical path length of front incident light to the first region A coincides with the optical path length of the first region, and is denoted by $n_1 d_1$, and the reciprocating optical path length of front incident/reflected light is denoted by $2n_1 d_1$. Similarly, in the second region B, the optical path length of front incident light is denoted by $n_2 d_2$, and the reciprocating optical path length of front incident/reflected light is denoted by $2n_2 d_2$. Therefore, the optical path difference (the difference in reciprocating optical path length) between the first reflected light and the second reflected light is represented by an absolute value of $2(n_1 d_1 - n_2 d_2)$.

Theoretically, in a case where the difference in reciprocating optical path length is $(2m+1)\lambda/2$ (m is 0, 1, 2, 3, . . . ), the phase is shifted by π and the reflected light becomes dark, and in a case where the difference in reciprocating optical path length is $m\lambda$ (=0, 1, 2, 3, . . . ), the phases coincide with each other and the reflected light becomes bright.

For example, the theoretical optical path length difference in which first reflected light and second reflected light of front incident light cancel each other is $2(n_1 d_1 - n_2 d_2) = (2m+1)\lambda/2$.

In the optical laminate 10, interference is made such that with respect to front incident light, front reflection is weakened and oblique reflection at a specific reflection angle is strengthened, and with respect to oblique incidence at a specific incidence angle, oblique reflection at a specific reflection angle is weakened and front reflection is strengthened. Accordingly, the reflected light of the front incident light is shifted to a short wavelength, and it is possible to obtain an effect of suppressing the short wavelength shift of the reflected light of the oblique incident light. As a result, it is possible to obtain an effect of suppressing the wavelength shift amount during visual recognition from the front side or from an oblique direction.

In order to suppress the wavelength shift amount as described above, it is necessary to simultaneously consider the degree of short wave shift of the cholesteric layer in oblique light, together with the application of the above theory of interference by the optical path length difference, so as to make the central wavelength of reflection when the front incident light is obliquely reflected and the central wavelength of reflection when the oblique incident light is reflected to the front side as close as possible to each other. According to the studies of the inventors, in order to make the central wavelength of reflection when the front incident light is obliquely reflected and the central wavelength of reflection when the oblique incident light is reflected to the front side as close as possible to each other, the optical path length difference between the first optical path length and the second optical path length is preferably $0.27\lambda$ to $0.45\lambda$ where $\lambda$ is the central wavelength of the reflection wavelength region. In a case where the optical path length difference is within this range, it is possible to suppress the front reflection of the front incident light and to strengthen the reflected light of the front incident light at a specific reflection angle. In addition, it is possible to strengthen the reflected light of the oblique incident light to the front side. As a result, since the reflection wavelength of the front incident light and the reflection wavelength of the oblique incident light can be brought close to each other to be substantially equal, and the short wavelength shift of the reflected light can be suppressed, wavelengths of the strengthened reflected light are observed from the absolute phase adjustment layer side of the optical laminate.

In order to make the optical path lengths of the first region and the second region different from each other, at least one of the refractive indices or the film thicknesses of the constituent materials of the first region and the second region may be made different. In this embodiment shown in FIG. 1, the first region A and the second region B have the same film thickness, and are formed of a first refractive index layer 14a and a second refractive index layer 14b having different refractive indices, respectively. In a case where the optical path length difference is adjusted only by the refractive index, it is preferable that the refractive index of the first region A is set to 1.4 to 1.6, the refractive index of the second region is set to 1.8 to 2.0, and the difference in refractive index between both the regions is set to 0.2 to 0.6.

Figure 2:
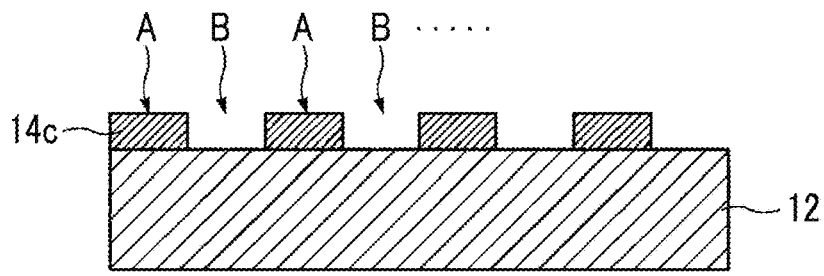
FIG. 2 is a cross-sectional view showing a configuration of first and second regions of an absolute phase adjustment layer.

As shown in FIG. 2, a refractive index layer 14c may be provided only in one of a first region A and a second region B, and the second region B may be formed of an air layer. In addition, the film thicknesses of the first region A and the second region B formed of the same refractive index material may be made different.

Figure 3:
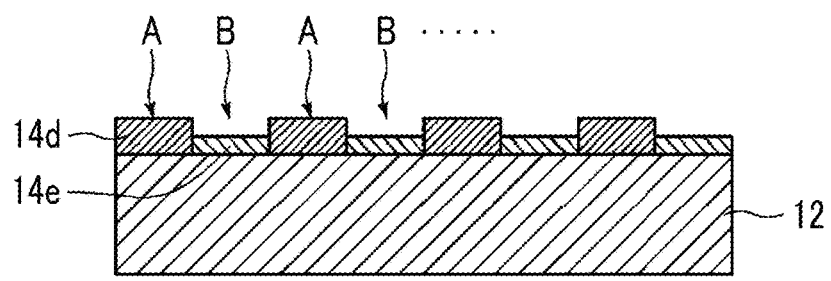
FIG. 3 is a cross-sectional view showing a configuration of first and second regions of an absolute phase adjustment layer.

As shown in FIG. 3, a first refractive index layer 14d may be provided in a first region A, a second refractive index layer 14e having a different refractive index from the first refractive index layer 14d may be provided in a second region B, such that the film thicknesses of both the layers are made different.

Figure 4:
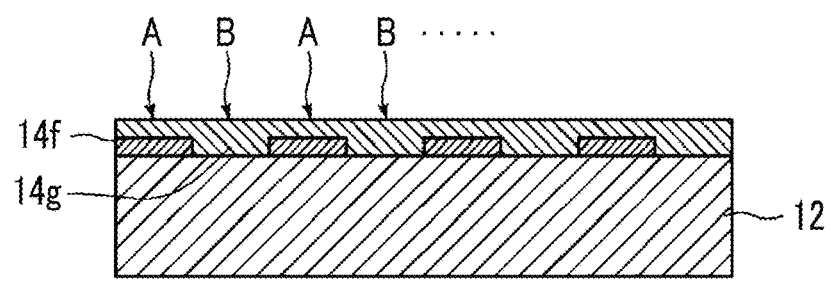
FIG. 4 is a cross-sectional view showing a configuration of first and second regions of an absolute phase adjustment layer.

As shown in FIG. 4, a first refractive index layer 14f may be provided in a first region A, and a second refractive index layer 14g may be provided on the first refractive index layer 14f and in the second region B in common.

FIGS. 5 to 8 are schematic plan views showing examples of the arrangement pattern of the first region A and the second region B in the absolute phase adjustment layer of the optical laminate. Hereinafter, shapes of the first region A and the second region B in plan view will be described.

Figure 5:
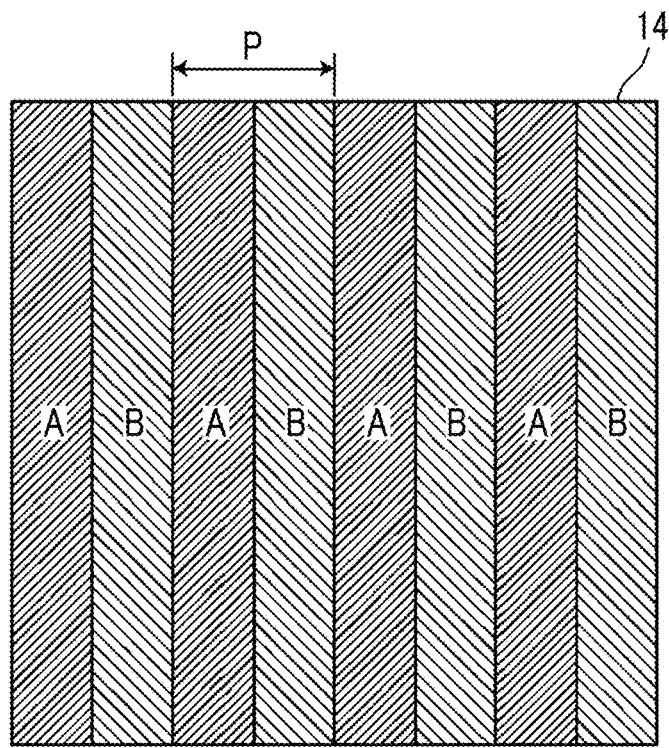
FIG. 5 is a plan view showing a first example of the arrangement pattern of the first and second regions of the absolute phase adjustment layer.

As shown in FIG. 5, the absolute phase adjustment layer 14 may have an arrangement pattern in which a first region A and a second region B have the same stripe shape, and are alternately arranged in a width direction of the stripe shape. The stripe widths of the first region A and the second region B are the same, and the stripe width is half a period P. Hereinafter, the pattern shown in FIG. 5 will be referred to as a line pattern.

Figure 6:
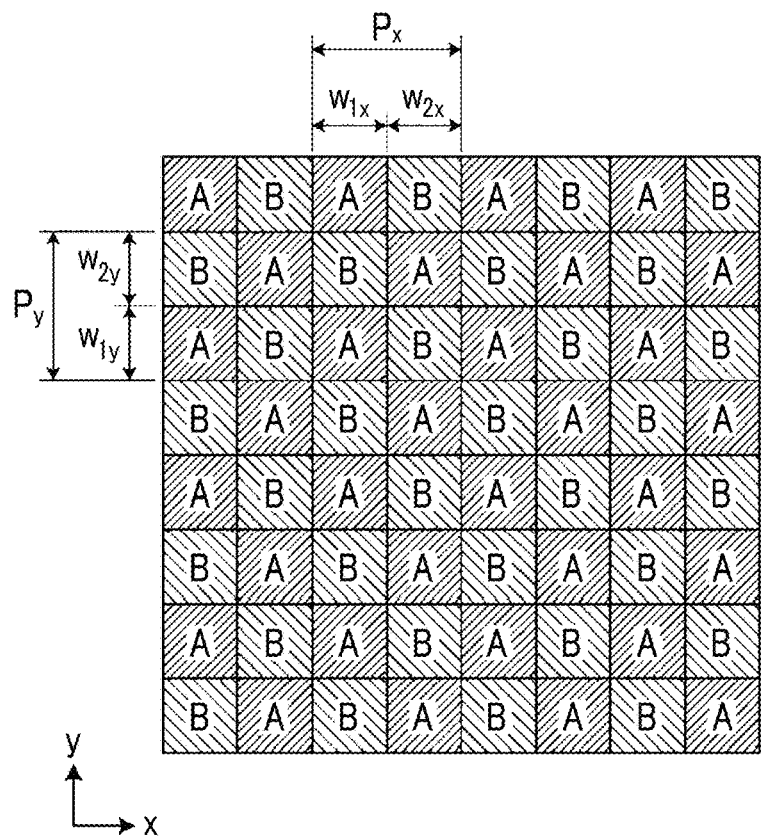
FIG. 6 is a plan view showing a second example of the arrangement pattern of the first and second regions of the absolute phase adjustment layer.

As shown in FIG. 6, the absolute phase adjustment layer 14 may have an arrangement pattern in which a first region A and a second region B have the same rectangular shape, and are alternately arranged in horizontal and vertical directions (in directions of the arrows x and y in the drawing). Hereinafter, the pattern shown in FIG. 6 will be referred to as a checker pattern. The rectangular shape may be a rectangle ($w_{1x} \neq w_{1y}$, $w_{2x} \neq w_{2y}$) or a square ($w_{1x}=w_{1y}$, $w_{2x}=w_{2y}$), and is preferably a square. In a case where the first region A and the second region B have the same square shape ($w_{1x}=w_{1y}=w_{2x}=w_{2y}$), a horizontal period $P_x$ and a vertical period $P_y$ of the first regions A and the second regions B shown in FIG. 6 are the same. In this case, the periods P may be substantially the same, and an error of up to 5% of the length of the period P is allowed. In the line pattern shown in FIG. 5, the wavelength shift suppression effect described above is exhibited during visual recognition from the alignment direction of the stripes. In the checker pattern shown in FIG. 6, a similar effect can be obtained from the two x- and y-directions.

Figure 7:
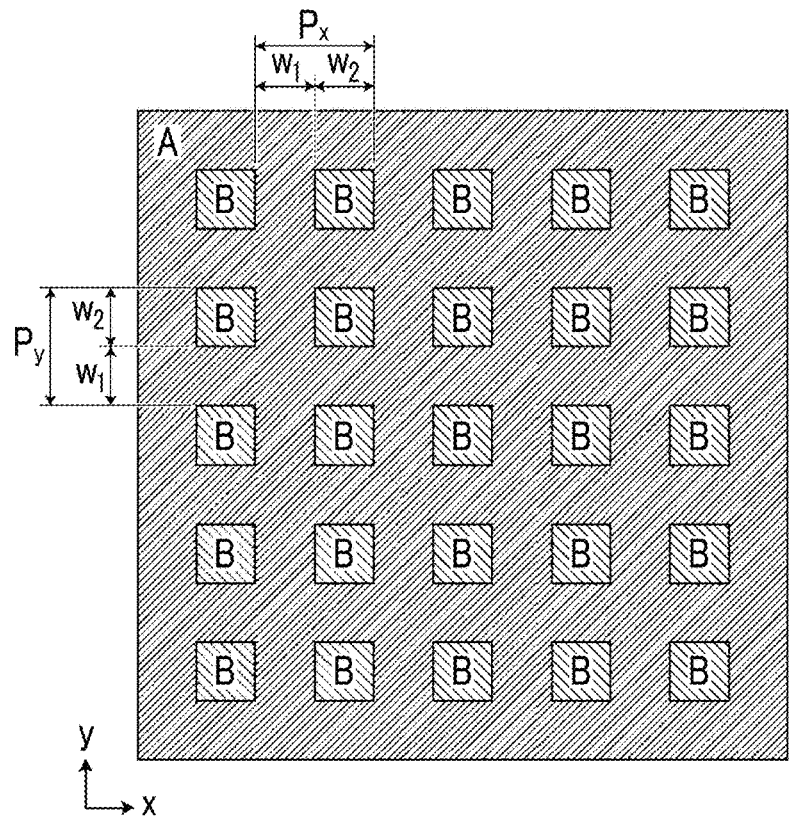
FIG. 7 is a plan view showing a third example of the arrangement pattern of the first and second regions of the absolute phase adjustment layer.

As shown in FIG. 7, an arrangement pattern in which second regions B are two-dimensionally periodically arranged in a first region A may be used. In this case, the first region A has a portion which is continuously formed, and the second regions B are two-dimensionally arranged in the first region A in horizontal and vertical directions (in directions of the arrows x and y) with periods $P_x$ and $P_y$. The period $P_x$ in the x-direction and the period $P_y$ in the y-direction may be the same or different, and at least one of the periods is preferably about 0.4 μm to 3.0 μm, and particularly preferably 0.6 μm to 2.0 μm. Both of the periods $P_x$ and $P_y$ are preferably within a range of 1.0 μm to 2.0 μm.

Figure 8:
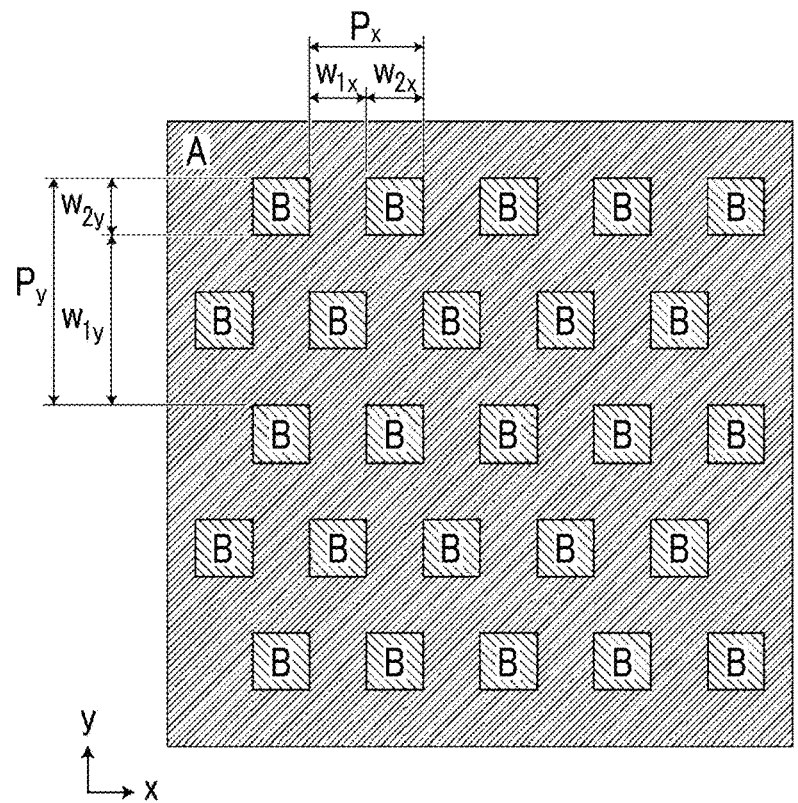
FIG. 8 is a plan view showing a fourth example of the arrangement pattern of the first and second regions of the absolute phase adjustment layer.

Furthermore, as shown in FIG. 8, an arrangement pattern in which second regions B having a square shape are arranged in a first region A in horizontal and vertical directions with different periods $P_x$ and $P_y$, may be used. In the example shown in FIG. 8, the first regions A and the second regions B have portions which are alternately arranged in a x-direction with the period $P_x$ and portions in which only the first region A is continuously formed. In a y-direction, the first region A having a width $w_{1y}$ and the second region B having a width $w_{2y}$ are alternately arranged with the period $P_y$.

The arrangement pattern of the first region A and the second region B in the absolute phase adjustment layer is not limited to those shown in FIGS. 5 to 8, and is not particularly limited as long as the first region A and the second region B form an arrangement pattern in which interference can be made between the first reflected light and the second reflected light.

Figure 9:
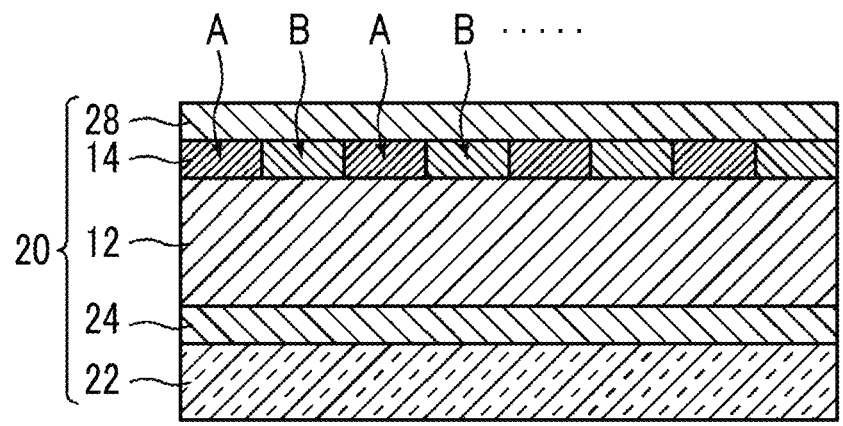
FIG. 9 is a schematic cross-sectional view showing an optical laminate according to a second embodiment.

FIG. 9 is a schematic cross-sectional view of an optical laminate according to a second embodiment.

The optical laminate according to the embodiment of the invention may have a configuration in which a wavelength selective reflective element 12 and an absolute phase adjustment layer 14 are laminated in order on an alignment layer 24 provided on one surface of a support 22 as in an optical laminate 20 according to the embodiment shown in FIG. 9. Furthermore, a diffusion plate 28 may be provided on a surface of the absolute phase adjustment layer 14 (a surface opposite to a surface on which the wavelength selective reflective element 12 is provided).

In a case where the optical laminate 10 according to the first embodiment is observed from the side of the absolute phase adjustment layer 14, bright lines or dark lines are shown as interference light. However, by providing the diffusion plate 28, interference light emitted from the absolute phase adjustment layer 14 is diffused by the diffusion plate 28 and can be observed as diffused light.

The substrate, the alignment layer, and the diffusion plate can be similarly provided in an optical laminate according to the following embodiment. An adhesion layer may be provided between the layers as necessary.

Figure 10:
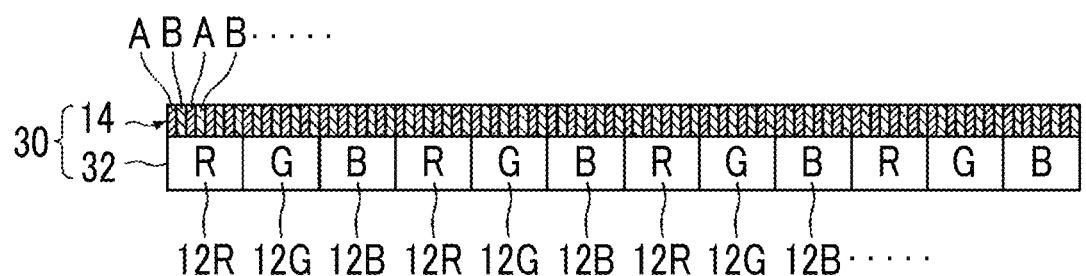
FIG. 10 is a schematic cross-sectional view showing an optical laminate according to a third embodiment.

FIG. 10 is a schematic cross-sectional view of an optical laminate according to a third embodiment.

In an optical laminate 30 according to this embodiment, a wavelength selective reflective element 32 has two or more cholesteric liquid crystal layers 12R, 12G, and 12B having different reflection wavelength regions, and the cholesteric liquid crystal layers are arranged in a pattern with a larger period than the period of a first region A and a second region B of an absolute phase adjustment layer 14.

In the cholesteric liquid crystal layer 12R, the reflection wavelength region is a red wavelength region. In the cholesteric liquid crystal layer 12G, the reflection wavelength region is a green wavelength region. In the cholesteric liquid crystal layer 12B, the reflection wavelength region is a blue wavelength region.

Desired red light, green light, and blue light set previously can be reflected at the cholesteric liquid crystal layers 12R, 12G, and 12B, respectively, according to the same principle as the optical laminate according to the first embodiment.

Here, the blue light is light having a wavelength of 380 nm or greater and less than 500 nm, the green light is light having a wavelength of 500 nm or greater and less than 600 nm, and the red light is light having a wavelength of 600 nm or greater and less than 780 nm. Infrared light is light having a wavelength of 780 nm to 850 nm. Regarding the fact that the reflection wavelength region is a red wavelength region, the central wavelength of the wavelength region in which light is selectively reflected may be within a red wavelength region, and the above fact does not mean that light within a wavelength region of 600 nm or greater and less than 780 nm is all reflected. The half-width of the reflection wavelength region is about 50 to 150 nm.

Figure 11:
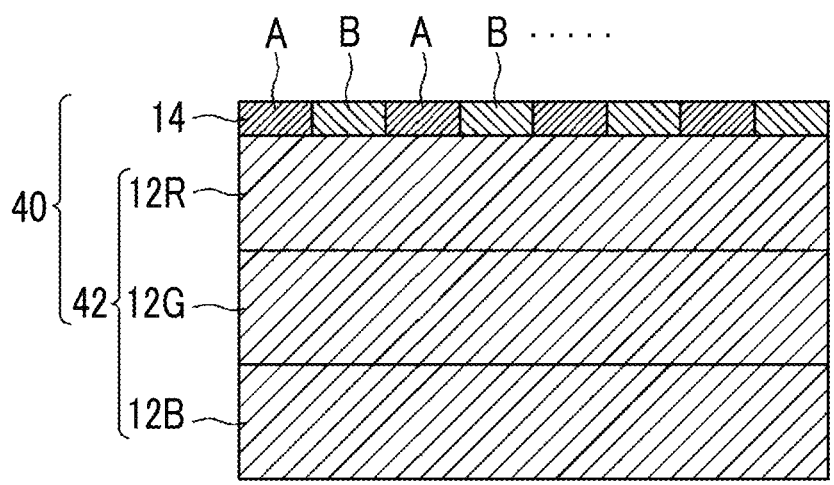
FIG. 11 is a schematic cross-sectional view showing an optical laminate according to a fourth embodiment.

FIG. 11 is a schematic cross-sectional view of an optical laminate according to a fourth embodiment.

An optical laminate 40 according to this embodiment is different from the optical laminate 10 according to the first embodiment in that a wavelength selective reflective element 42 is formed by laminating cholesteric liquid crystal layers 12R, 12G, and 12B having different reflection wavelength regions.

In this configuration, it is also possible to reflect desired red light, green light, and blue light set previously at cholesteric liquid crystal layers 12R, 12G, and 12B, respectively, according to the same principle as the optical laminate according to the first embodiment. In the optical laminate 30 according to the third embodiment, any one of red light, green light, or blue light is reflected from a different planar region, but in the optical laminate 40 according to this embodiment, it is possible to reflect a plurality of colors from the same region.

Figure 12:
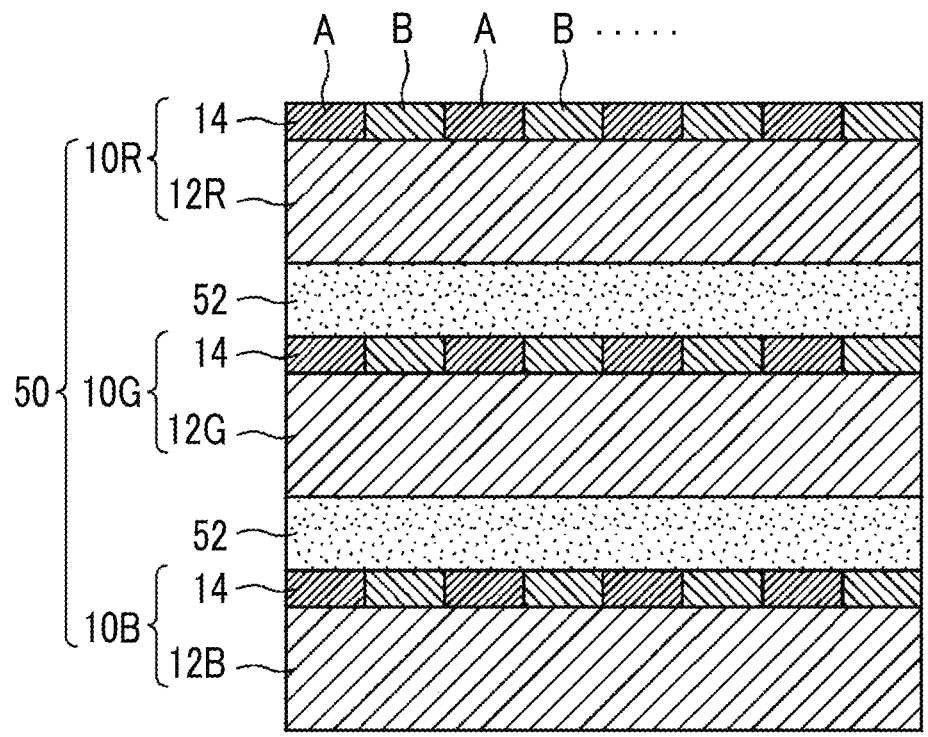
FIG. 12 is a schematic cross-sectional view showing an optical laminate according to a fifth embodiment.

FIG. 12 is a schematic cross-sectional view of an optical laminate according to a fifth embodiment.

An optical laminate 50 according to this embodiment is configured by laminating an optical laminate 10R in which the wavelength selective reflective element 12 is a cholesteric liquid crystal layer 12R whose reflection wavelength region is a wavelength region of red light in the optical laminate 10 according to the first embodiment described above, an optical laminate 10G in which the wavelength selective reflective element 12 is a cholesteric liquid crystal layer 12G whose reflection wavelength region is a wavelength region of green light, and an optical laminate 10B in which the wavelength selective reflective element 12 is a cholesteric liquid crystal layer 12B whose reflection wavelength region is a wavelength region of blue light. The optical laminate 10R and the optical laminate 10G, and the optical laminate 10G and the optical laminate 10B are laminated via an adhesion layer 52, respectively. In this example, the absolute phase adjustment layer 14 of the optical laminate 10R becomes a light incidence surface. In this configuration, it is also possible to reflect a plurality of colors from the same region as in the optical laminate 40 according to the fourth embodiment.

In the above-described embodiment, the case where in the optical laminate, the wavelength selective reflective element is provided with a reflection layer selectively reflecting light in a specific reflection wavelength region, and the reflection layer is formed of a cholesteric liquid crystal layer has been described, but the wavelength selective reflective element is not limited thereto. In the wavelength selective reflective element, the reflection layer may be a dielectric multilayer film.

Figure 13:
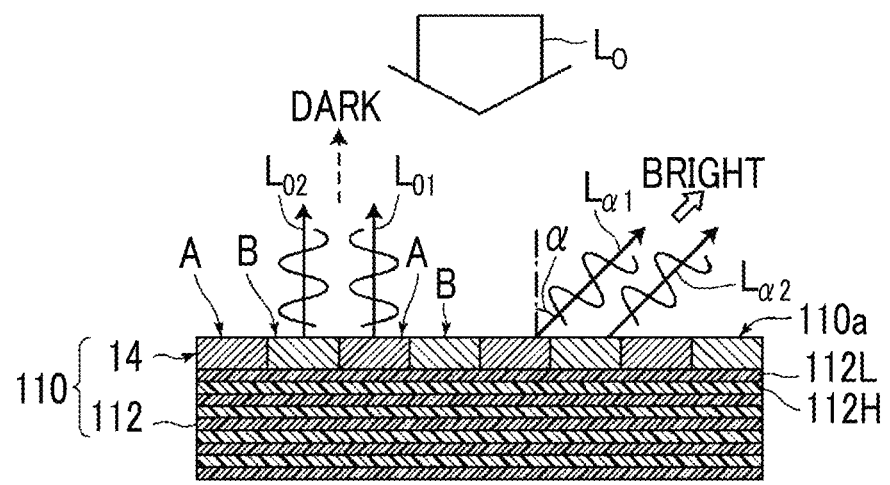
FIG. 13 is a schematic cross-sectional view showing an optical laminate according to a sixth embodiment.

FIG. 13 is a schematic cross-sectional view of an optical laminate according to a sixth embodiment.

An optical laminate 110 according to this embodiment is provided with, in place of the wavelength selective reflective element 12 formed of a reflection layer which is a cholesteric liquid crystal layer in the optical laminate 10 according to the first embodiment, a wavelength selective reflective element 112 formed of a reflection layer which is a dielectric multilayer film in which at least two layers having different refractive indices are alternately laminated in multiple layers.

The dielectric multilayer film is formed by alternately laminating a high refractive index layer 112H having a relatively high refractive index and a low refractive index layer 112L having a relatively low refractive index. Each of the high refractive index layer 112H and the low refractive index layer 112L may be formed of an organic layer or an inorganic layer. In addition, the dielectric multilayer film may selectively reflect a specific wavelength region, and may or may not have polarization reflection properties.

Since the optical laminate 110 is provided with the same absolute phase adjustment layer 14 as the optical laminate 10 according to the first embodiment, an effect similar to that of the first embodiment is obtained. That is, a difference is generated in absolute phase between light which enters a first region A of the absolute phase adjustment layer 14 and is reflected by the wavelength selective reflective element 12 and light which enters a second region B and is reflected by the wavelength selective reflective element 12, of incident light $L_0$ incident from a surface 110a of the optical laminate 110 on the side of the absolute phase adjustment layer 14.

Due to the interference between two light components which are different in absolute phase from each other, the reflected light is strengthened or weakened according to the emission direction (reflection angle) thereof. As a result, the incident light is reflected at an angle different from the specular reflection direction of the incident light.

By appropriately setting the layer configuration of the dielectric multilayer film, such as the refractive indices of the high refractive index layer 112H and the low refractive index layer 112L, a difference in refractive index between the high refractive index layer and the low refractive index layer, and the layer thicknesses, it is possible to set a central wavelength of reflection and a reflection wavelength range which are desired, that is, a specific reflection wavelength region.

In a case where the high refractive index layer 112H and the low refractive index layer 112L constituting the dielectric multilayer film do not have in-plane anisotropy, no polarization reflection properties are imparted, and thus light in a specific reflection wavelength region is reflected regardless of the polarization.

At least one of the high refractive index layer 112H or the low refractive index layer 112L constituting the dielectric multilayer film may have in-plane anisotropy to reflect specific linearly polarized light.

In the above description, the configuration has been described in which the absolute phase adjustment layer is formed only of the first region A and the second region B, but the absolute phase adjustment layer may be further provided with an intermediate region having an optical path length between the first optical path length and the second optical path length. In a case where an intermediate region is provided, intermediate regions are arranged in the periodic pattern of the first region and the second region in the absolute phase adjustment layer, and are periodically arranged together with the first region and the second region.

The intermediate region may be formed only of a region having a third optical path length between the first optical path length and the second optical path length, or may be formed of a region having a third optical path length between the first optical path length and the second optical path length and a region having a fourth optical path length. The intermediate region may be formed of three or more (third, fourth, fifth . . . ) regions having different optical path lengths. In a case where the intermediate region is formed of a plurality of regions, the optical path length of each region is between the first optical path length and the second optical path length.

In FIGS. 15 to 20, examples of a periodic pattern in a case where the absolute phase adjustment layer has an intermediate region will be described.

Figure 14:
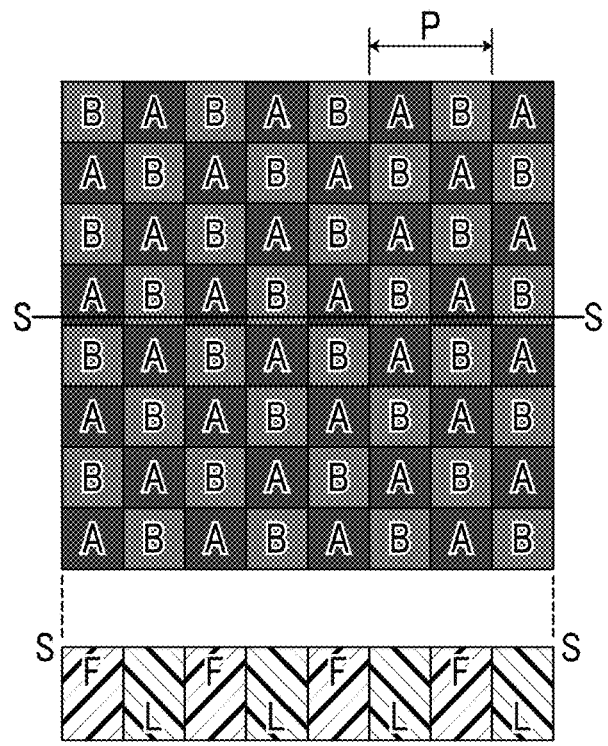
FIG. 14 shows a plan view and a cross-sectional view of a checker pattern which is an example of the arrangement pattern in a case where the absolute phase adjustment layer has first and second regions only.
Figure 15:
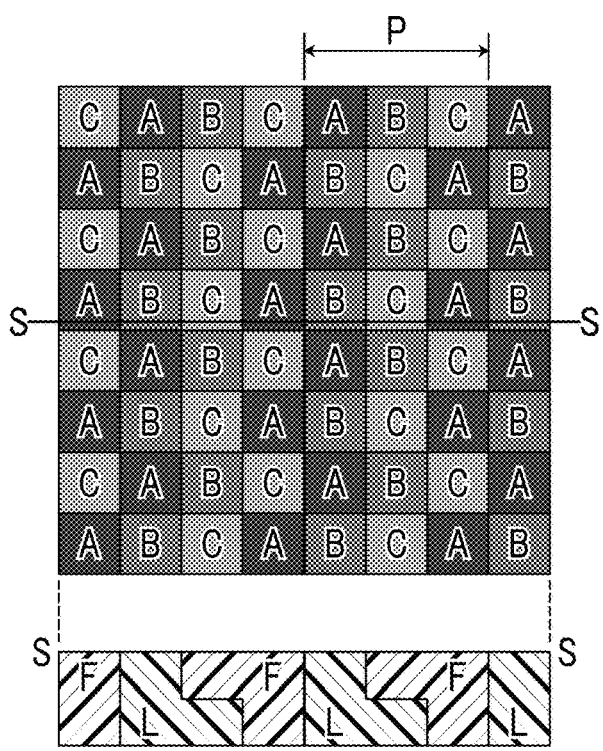
FIG. 15 shows a plan view and a cross-sectional view of a checker pattern which is an example of the arrangement pattern in a case where the absolute phase adjustment layer has first, second, and third regions.

FIG. 15 shows a checker pattern in which third regions C are further provided in a checker pattern in which first regions A and second regions B having the same square shape are alternately arranged in horizontal and vertical directions as shown in FIG. 14. In the checker pattern shown in FIG. 15, a pattern of first region A-second region B-third region C is periodically arranged in one direction. In a direction orthogonal to the one direction, the repeated pattern of A-B-C in one direction is shifted by ⅓ period and repetitively arranged.

For example, as shown in the cross-sectional view (lower view) taken along the line S-S of the plan view (upper view) of the periodic pattern in FIG. 14, the first region A is formed of a low refractive index layer F, and the second region B is formed of a high refractive index layer L. Meanwhile, as shown in the cross-sectional view (lower view) taken along the line S-S of the periodic pattern in FIG. 15, the third region C may have, for example, a lamination structure of the low refractive index layer F constituting the first region A and the high refractive index layer L constituting the second region B. Due to this lamination structure, a third optical path length of the third region is between the first optical path length and the second optical path length. The third region C may be formed of a different material having an intermediate refractive index between those of the low refractive index layer and the high refractive index layer.

Figure 16:
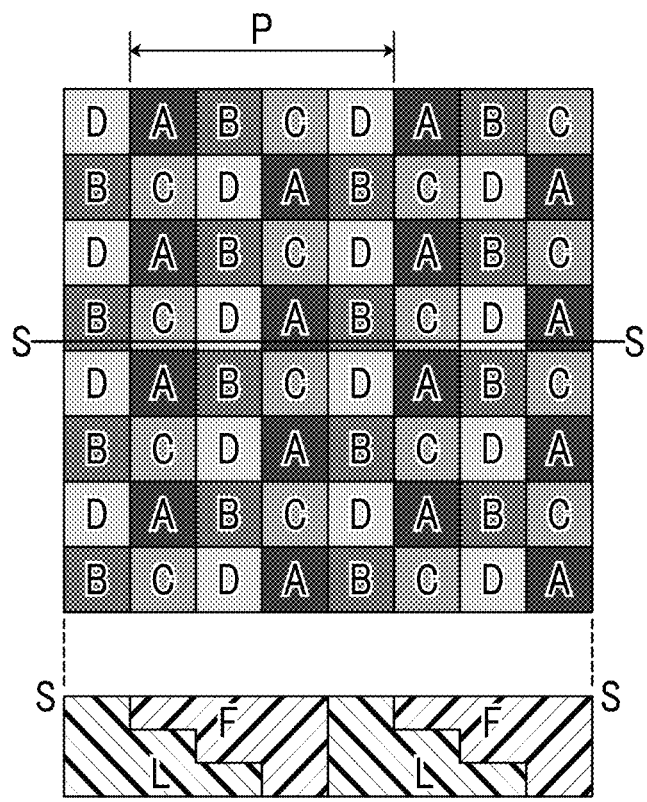
FIG. 16 shows a plan view and a cross-sectional view of a checker pattern which is an example of the arrangement pattern in a case where the absolute phase adjustment layer has first, second, third, and fourth regions.

FIG. 16 shows a pattern in which as an intermediate region, a fourth region is provided in addition to the third region, a pattern of first region A-second region B-third region C-fourth region D is periodically arranged in a first direction (horizontal direction in the drawing), and the pattern of A-B-C-D in the first direction is shifted by ½ period and arranged in a second direction (vertical direction in the drawing) orthogonal to the first direction. As shown in the cross-sectional view (lower view) taken along the line S-S of the periodic pattern in FIG. 16, the third region C and the fourth region D may have, for example, a lamination structure of a low refractive index layer L constituting the first region A and a high refractive index layer F constituting the second region B. By changing the ratio between the low refractive index layer L and the high refractive index layer F in the third region C and the fourth region D, the third region and the fourth region may have a third optical path length and a fourth optical path length, respectively, which are between the first optical path length and the second optical path length and are different from each other.

In the checker pattern of only the first regions A and the second regions B shown in FIG. 14, the same regions are connected in a diagonal direction of each region, and the wavelength shift suppression effect is small during visual recognition from the diagonal direction. Meanwhile, in a case where the third regions C are provided as shown in FIG. 15, the number of places where the first regions A are diagonally adjacent to each other and places where the second regions B are diagonally adjacent to each other is smaller than in the case of FIG. 14. Therefore, it is possible to reduce the region in which the effect is reduced according to the visual recognition direction. Furthermore, in the checker pattern shown in FIG. 16, the first regions A are not connected to each other, and the second regions B are also not connected to each other in any direction. Accordingly, the same wavelength shift suppression effect can be obtained during visual recognition from any direction.

Figure 17:
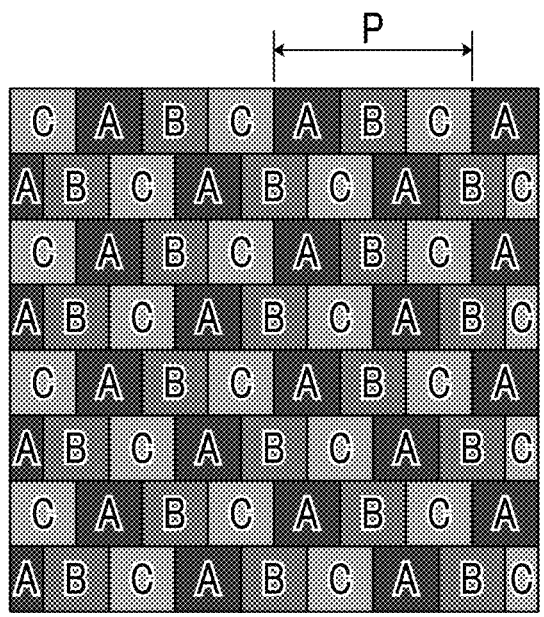
FIG. 17 is a plan view of a brick pattern which is an example of the arrangement pattern in a case where the absolute phase adjustment layer has first, second, and third regions.
Figure 18:
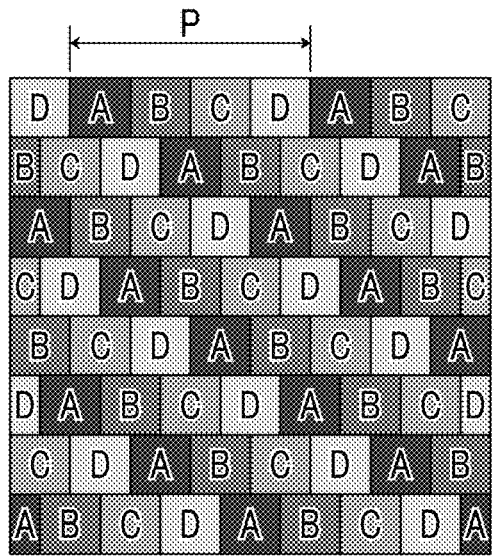
FIG. 18 is a plan view of a brick pattern which is an example of the arrangement pattern in a case where the absolute phase adjustment layer has first, second, third, and fourth regions.

In periodic patterns shown in FIGS. 17 and 18, the shape of each region is a square. The periodic pattern in FIG. 17 is provided with a first region A, a second region B, and a third region C. The regions are periodically arranged in a pattern of A-B-C in a first direction which is a horizontal direction in the drawing, and are arranged in a pattern of A-B-C shifted by ½ period in a second direction orthogonal to the first direction, and thus a brick pattern is formed.

The periodic pattern shown in FIG. 18 is a brick pattern similarly to FIG. 17, but further includes a fourth region D, and a pattern of A-B-C-D is periodically arranged in a first direction.

In any of the patterns of FIGS. 17 and 18, neither places where the first regions A are adjacent to each other, nor places where the second regions B are adjacent to each other are present. Accordingly, the dependency of the wavelength shift suppression effect on the azimuthal angle is suppressed.

Figure 19:
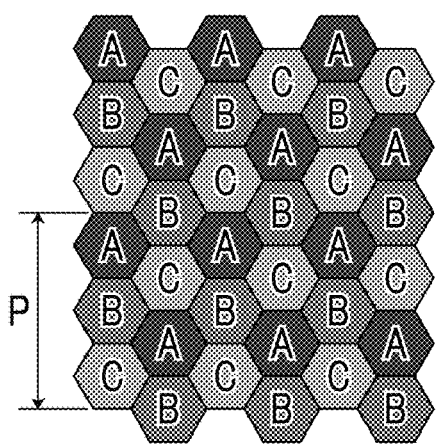
FIG. 19 is a plan view of a honeycomb pattern which is an example of the arrangement pattern in a case where the absolute phase adjustment layer has first, second, and third regions.
Figure 20:
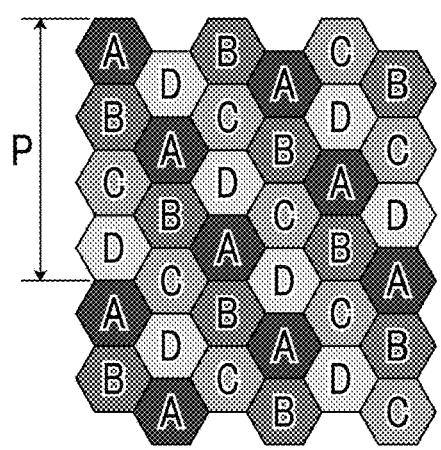
FIG. 20 is a plan view of a honeycomb pattern which is an example of the arrangement pattern in a case where the absolute phase adjustment layer has first, second, third, and fourth regions.

In periodic patterns shown in FIGS. 19 and 20, each region has a regular hexagonal shape, and regular hexagonal regions are periodically arranged without gaps. The patterns shown in FIGS. 19 and 20 are referred to as a honeycomb pattern. In the honeycomb pattern shown in FIG. 19, a first region A, a second region B, and a third region C are periodically arranged in a pattern of A-B-C in all alignment directions of the regular hexagons, that is, in three directions. In the honeycomb pattern shown in FIG. 20, a first region A, a second region B, a third region C, and a fourth region D are periodically arranged in a pattern of A-B-C-D in two of alignment directions of the regular hexagons.

In any of the patterns of FIGS. 19 and 20, neither places where the first regions A are adjacent to each other, nor places where the second regions B are adjacent to each other are present. Accordingly, the dependency of the wavelength shift suppression effect on the azimuthal angle is suppressed.

In the above-described examples, the shape of each region such as the first region or the second region is a rectangular shape or a regular hexagonal shape. However, the shape of each region is not limited thereto, and each region may have such a shape that the first region A and the second region B can be arranged in a pattern of the period of the diffraction grating in at least one direction.

Materials of the layers constituting the optical laminate according to the embodiment of the invention will be described.

[Wavelength Selective Reflective Element]

[[Reflection Layer: Cholesteric Liquid Crystal Layer]]

By changing the pitch or the refractive index of the helical structure in the cholesteric liquid crystal phase, the central wavelength of reflection can be adjusted. The pitch of the helical structure can be easily adjusted by changing the amount of a chiral agent to be added. Detailed description thereof is given as in Fuji Film research & development No. 50 (2005), p. 60 to 63. The pitch can also be adjusted by conditions such as a temperature, an illuminance, and an irradiation time in fixation of the cholesteric liquid crystal phase.

The cholesteric liquid crystal layer selectively reflects either one of right-handed circularly polarized light or left-handed circularly polarized light in the reflection wavelength region, and transmits the other circularly polarized light.

(Polymerizable Liquid Crystal Compound)

A polymerizable liquid crystal composition for forming a cholesteric liquid crystal layer contains a rod-like liquid crystal compound or a disk-like liquid crystal compound, and may further contain other components such as a chiral agent, an alignment control agent, a polymerization initiator, and an alignment aid.

—Rod-Like Liquid Crystal Compound—

As the rod-like liquid crystal compound, azomethines, azoxys, cyanobiphenyls, cyanophenyl esters, benzoates, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexylbenzonitriles are preferably used. In addition to the above low-molecular liquid crystal compounds, high-molecular liquid crystal compounds can also be used.

The alignment of the rod-like liquid crystal compound is more preferably fixed by polymerization, and as a polymerizable rod-like liquid crystal compound, compounds described in Makromol. Chem., Vol. 190, p. 2255 (1989), Advanced Materials Vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1995-016616A (JP-H06-016616A), JP1996-110469A (JP-H07-110469A), JP2000-080081A (JP-H11-080081A), JP2001-064627A, and the like can be used. Furthermore, as the rod-like liquid crystal compound, for example, those described in JP2000-513019A (JP-H11-513019A) and JP2007-279688A can also be preferably used.

—Disk-Like Liquid Crystal Compound—

As the disk-like liquid crystal compound, for example, those described in JP2007-108732A and JP2010-244038A can be preferably used.

Hereinafter, preferable examples of the disk-like liquid crystal compound will be shown, but the invention is not limited thereto.

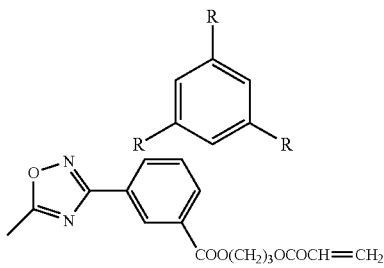

Compound 1

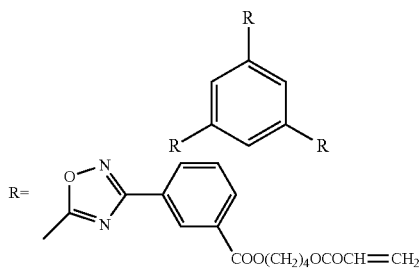

Compound 2

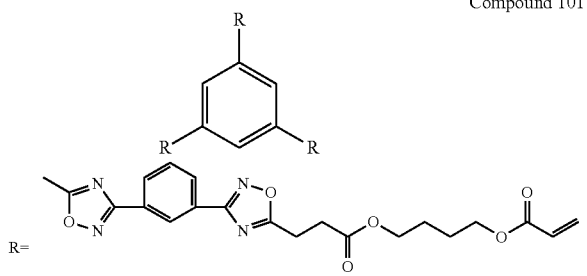

Compound 101

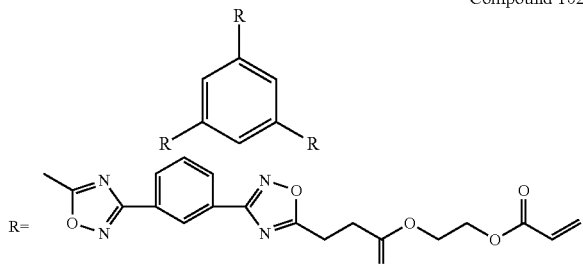

Compound 102

—Other Components—

The composition which is used for forming a cholesteric liquid crystal layer may contain other components such as a chiral agent, an alignment control agent, a polymerization initiator, and an alignment aid, in addition to the disk-like liquid crystal compound. A known material can be used as any of them.

—Solvent—

As a solvent of the composition for forming a cholesteric liquid crystal layer, an organic solvent is preferably used.

Examples of the organic solvent include amides (e.g., N,N-dimethylformamide), sulfoxides (e.g., dimethylsulfoxide), heterocyclic compounds (e.g., pyridine), hydrocarbons (e.g., benzene and hexane), alkyl halides (e.g., chloroform and dichloromethane), esters (e.g., methyl acetate and butyl acetate), ketones (e.g., acetone, methyl ethyl ketone, and cyclohexanone), and ethers (e.g., tetrahydrofuran and 1,2-dimethoxyethane). Alkyl halides and ketones are preferable. Two or more types of organic solvents may be used in combination.

(Application and Curing of Polymerizable Liquid Crystal Composition)

In order to apply the polymerizable liquid crystal composition, the polymerizable liquid crystal composition is allowed to be in a solution state with a solvent, or is turned into a liquid material such as a melt by heating, and the resulting material is applied by a proper method such as a roll coating method, a gravure printing method, or a spin coating method. The polymerizable liquid crystal composition can also be applied by various methods such as a wire bar coating method, an extrusion coating method, a direct gravure coating method, a reverse gravure coating method, and a die-coating method. A coating film can also be formed by discharging a liquid crystal composition from a nozzle using an ink jet apparatus.

Thereafter, the polymerizable liquid crystal composition is cured to maintain and fix the alignment state of molecules of the liquid crystal compound. The curing is preferably performed by a polymerization reaction of a polymerizable group introduced into the liquid crystal molecule.

After the application of the polymerizable liquid crystal composition and before the polymerization reaction for curing, the coating film may be dried by a known method. For example, it may be dried by leaving or heating.

The liquid crystal compound molecules in the polymerizable liquid crystal composition may be aligned in the steps of applying and drying the polymerizable liquid crystal composition.

[Reflection Layer: Dielectric Multilayer Film]

The dielectric multilayer film is formed by laminating two or more dielectric layers having different refractive indices, and by adjusting the refractive index or the thickness of each layer, a reflection layer capable of selectively reflecting a desired wavelength region is formed.

A dielectric multilayer film formed of an organic layer can be formed by, for example, alternately laminating two types of aligned birefringent polymer layers. For example, the dielectric multilayer film can be formed with reference to materials of a multilayer optical film and multilayer optical film forming methods described in JP2000-508378A (JP-H11-508378A).

In addition, a dielectric multilayer film formed of an inorganic layer can be formed with reference to, for example, materials of a dielectric multilayer film and dielectric multilayer film forming methods described in WO2014/010532A. As the inorganic material, a metal oxide is mainly used. The metal oxide which can be used is not particularly limited, but is preferably a transparent dielectric material. Examples thereof include titanium oxide, zirconium oxide, zinc oxide, synthetic amorphous silica, colloidal silica, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide, and any of a low refractive index layer and a high refractive index layer may be appropriately used in combination to adjust the refractive index. Among the above examples, titanium oxide, zirconium oxide, zinc oxide, and the like are preferably used as the high refractive index material according to the invention, and from the viewpoint of stability of the metal oxide particle-containing composition for forming the high refractive index layer, titanium oxide is more preferably used. Among titanium oxides, rutile type titanium oxides having low photocatalytic activity and a high refractive index are particularly preferably used.

[Absolute Phase Adjustment Layer]

The material constituting the absolute phase adjustment layer is not particularly limited as long as it is an isotropic material and can be set to have a different optical path length between the first region and the second region.

For example, indium tin oxide (ITO) or a refractive index-adjusted composition obtained by adjusting the refractive index by adding a metal oxide to a resin material can be used.

A general known low refractive index material can be used. Specifically, a composition containing a fluorine-containing curable resin and inorganic fine particles described in JP2007-298974A, or a low refractive index coating containing hollow silica particles described in JP2002-317152A, JP2003-202406A, and JP2003-292831A can be preferably used. In addition, a general known high refractive index material can also be used. Specifically, various materials shown in paragraphs [0074] to [0094] of JP2008-262187A can be used.

A refractive index photomodulation type material which changes the refractive index value by light irradiation can also be used. For example, a material such as a photopolymer which is used for holography can be used.

Next, other layers provided in the optical laminate will be described.

[Support]

As the support, a transparent support is preferable, and examples thereof include polyacrylic resin films such as polymethyl methacrylate, cellulose resin films such as cellulose triacetate, and cycloolefin polymer films [for example, trade name "ARTON" manufactured by JSR Corporation, and trade name "ZEONOR" manufactured by ZEON Corporation]. The support is not limited to a flexible film, and may be a non-flexible substrate such as a glass substrate.

The optical laminate according to the embodiment of the invention may be used while being supported by a support during film formation. Otherwise, the support during film formation may be a temporary support, and the optical laminate may be transferred to another support and used after peeling of the temporary support.

[Alignment Layer]

In a case where the wavelength selective reflective element is provided with a cholesteric liquid crystal layer, an alignment layer may be provided on a film forming surface of the element. The alignment layer can be provided by means such as rubbing of an organic compound (preferably a polymer), oblique Vapor deposition of an inorganic compound, or formation of a layer having microgrooves. Alignment layers have also been known in which alignment functions are generated by application of an electric field, application of a magnetic field, or light irradiation. The alignment layer is preferably formed by rubbing a surface of a polymer film. The alignment layer is preferably peeled off together with the support.

Depending on the type of the polymer used for the support, it is possible to make the support to function as an alignment layer through a direct alignment treatment (for example, rubbing) without providing an alignment layer. Examples of such a support include polyethylene terephthalate (PET).

[Diffusion Plate]

The diffusion plate is not particularly limited as long as it can relieve the steepness of the angle of reflected light, and any type may be used. A diffusion plate having small backscattering properties is preferable.

For example, in a case where turbidity of the film is converted into a haze value, the haze value is preferably 30% to 95%. The haze value can be measured by, for example, a haze meter NDH5000 (manufactured by Nippon Denshoku Industries Co., Ltd.).

[Adhesion Layer (Pressure Sensitive Adhesive Layer)]

In this specification, "adhesion" is a concept including "pressure-sensitive adhesion".

For example, in a case where the wavelength selective reflective element and the absolute phase adjustment layer are laminated, a plurality of optical laminates are laminated, or the diffusion plate is laminated on the absolute phase adjustment layer, these may be laminated via an adhesion layer.

Examples of the pressure sensitive adhesive which is used for the adhesion layer include resins such as polyester resins, epoxy resins, polyurethane resins, silicone resins, and acrylic resins. These may be used alone or in combination of two or more types thereof. Acrylic resins are particularly preferable since these are excellent in reliability such as water resistance, heat resistance, and light resistance and have good adhesion properties and transparency, and the refractive index is easily adjusted so as to be suitable for a liquid crystal display.

A sheet-like photocurable pressure sensitive adhesive (described in TOAGOSEI GROUP RESEARCH ANNUAL REPORT 11, TREND 2011, No. 14) can also be used as the adhesion layer. It facilitates bonding between optical films like a pressure sensitive adhesive, is crosslinked and cured by ultraviolet rays (UV), and has improved storage modulus of elasticity, adhesion properties, and heat resistance. Adhesion using the sheet-like photocurable pressure sensitive adhesive is a method suitable for the invention.

EXAMPLES

Hereinafter, examples and comparative examples of the optical laminate according to the embodiment of the invention will be described.

Example 1

An optical laminate comprising a reflection layer formed of a cholesteric liquid crystal layer as a wavelength selective reflective element was formed. A cholesteric liquid crystal layer was formed on an alignment layer provided on a glass substrate, and an absolute phase adjustment layer separately formed was bonded to the cholesteric liquid crystal layer to form an optical laminate. Details thereof will be described below.

(Formation of Alignment Layer)

Components of an alignment layer forming composition A shown below were stirred and dissolved in a container kept at 80° C. to prepare the alignment layer forming composition A.

| Alignment Layer Forming Composition A (parts by mass) | |
|---|---|
| Pure Water | 97.2 |
| PVA-205 (manufactured by KURARAY CO., LTD.) | 2.8 |

The alignment layer forming composition A prepared as described above was uniformly applied to a glass substrate using a slit coater, and then dried in an oven at 100° C. for 2 minutes to obtain a glass substrate with an alignment layer having a film thickness of 0.5 μm.

(Formation of Cholesteric Liquid Crystal Layer)

Components of a cholesteric liquid crystal composition Gm shown below were stirred and dissolved in a container kept at 25° C. to prepare the cholesteric liquid crystal composition Gm.

| Cholesteric Liquid Crystal Composition Gm (parts by mass) | |
|---|---|
| Methoxyethyl Acrylate | 145.0 |
| Following Mixture of Rod-Like Liquid Crystal Compounds | 100.0 |
| IRGACURE 819 (manufactured by BASF SE) | 10.0 |
| Chiral Agent A Having Following Structure | 5.78 |
| Surfactant Having Following Structure | 0.08 |

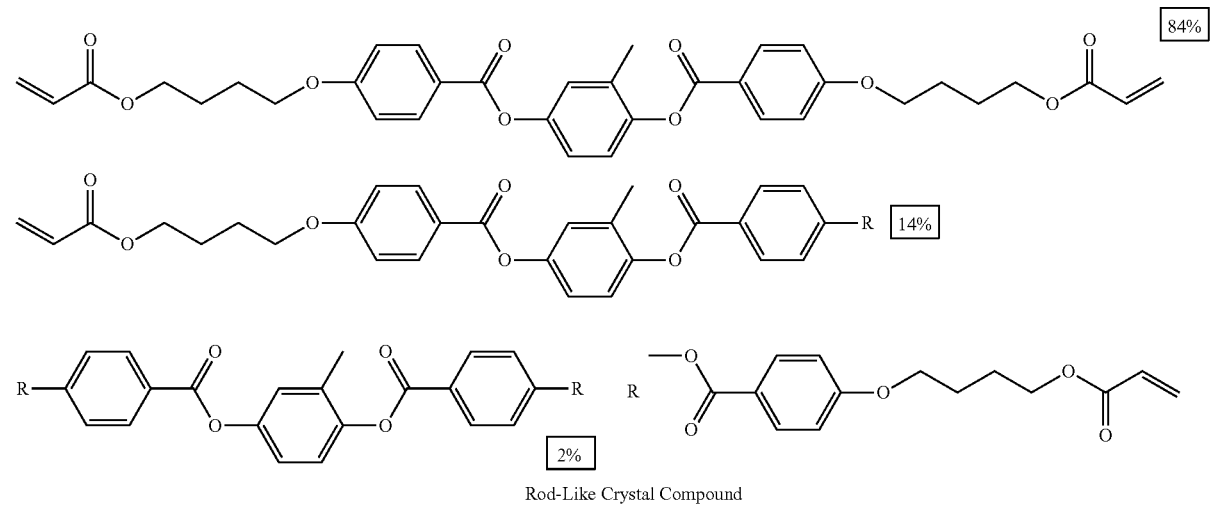

Rod-Like Crystal Compound

Numerical values represent mass %, and R is a group which is bonded with an oxygen atom.

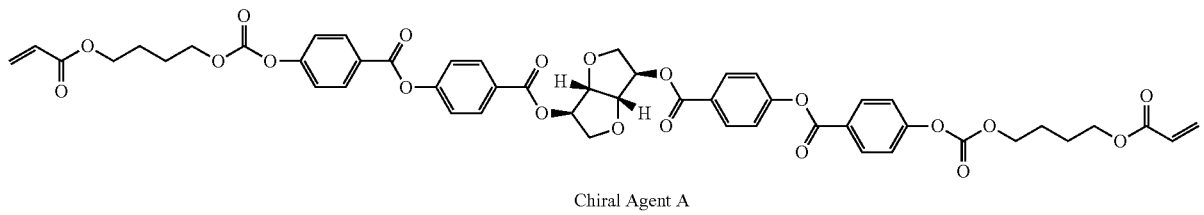

Chiral Agent A

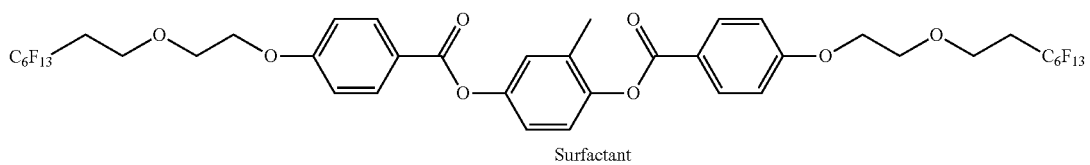

Surfactant

The cholesteric liquid crystal composition Gm is a material which forms a layer reflecting light having a central wavelength of 550 nm in a case where the light enters from a vertical direction. In addition, the cholesteric liquid crystal composition Gm is a material which forms a layer reflecting right-handed circularly polarized light. That is, the cholesteric liquid crystal composition Gm is a material for forming a right polarizing green layer.

After rubbing of the alignment film surface of the glass substrate with an alignment film formed as above, the cholesteric liquid crystal composition Gm prepared as above was uniformly applied using a slit coater, and then dried at 95° C. for 30 seconds. Then, the composition was irradiated with ultraviolet rays of 500 mJ/cm² at room temperature by an ultraviolet ray irradiation device so as to be cured to form a reflection layer comprising a cholesteric liquid crystal layer having a film thickness of 2 μm.

(Formation of Absolute Phase Adjustment Layer)

A periodic pattern layer in which a first region was formed of a zirconia-dispersed refractive index layer and a second region was formed of an indium tin oxide (ITO) layer was formed as an absolute phase adjustment layer on a temporary support. Here, the periodic pattern layer was a striped periodic pattern layer of the first region and the second region.

(Step of Forming Second Region (ITO Pattern Layer))

—Preparation of Resist Composition for ITO Etching—

[Synthesis of PHS-EVE (1-ethoxyethyl Protector of Para-hydroxystyrene)]

20 g of an alkali-soluble resin (VP-8000: manufactured by NIPPON SODA CO., LTD.) and 320 g of propylene glycol monomethyl ether acetate (PGMEA: manufactured by Daicel) were dissolved in a flask and subjected to distillation under reduced pressure to remove the water and PGMEA by azeotropic distillation. After confirmation of the fact that the water content was sufficiently low, 24 g of ethyl vinyl ether and 0.35 g of p-toluenesulfonic acid were added, and the mixture was stirred at room temperature for 1 hour. 0.28 g of triethylamine was added thereto, and the reaction was stopped. Ethyl acetate was added to the reaction liquid, and water washing was performed. Then, the ethyl acetate, water, and PGMEA of the azeotropic component were distilled away under reduced pressure to obtain PHS-EVE which was an alkali-soluble resin protected by an acid-decomposable group. The weight-average molecular weight of the obtained resin was 11,000. The polydispersity was 1.13.

The structure of the polymer PHS-EVE is 1-ethoxyethyl protector of p-hydroxystyrene/p-hydroxystyrene copolymer (30 mol %/70 mol %).

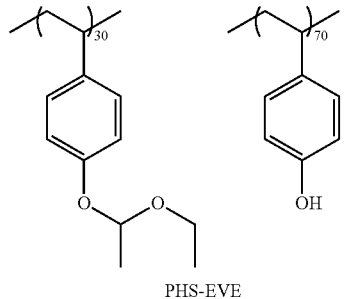

PHS-EVE

[Preparation of Resist Composition for ITO Etching]

Components of a resist composition for ITO etching shown below were stirred and dissolved in a container kept at 25° C. to prepare the resist composition for ITO etching.

| Resist Composition for ITO Etching (parts by mass) | |
| --- | --- |
| PGMEA | 900.0 |
| PHS-EVE Described Above | 95.8 |
| Photo Acid Generator PAG-1 Having Following Structure | 2.0 |
| Photosensitizer 1 Having Following Structure | 2.0 |
| Basic Compound 1 Having Following Structure | 0.1 |
| Surfactant F-554 Having Following Structure | 0.1 |

[[Photo Acid Generator PAG-1]]

A compound having the following structure synthesized according to a method described in paragraph [0108] of JP2002-528451A (Ts represents trisulfonate).

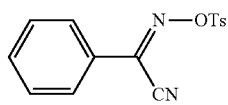

[[Photosensitizer 1]]

Dibutoxyanthracene having the following structure (producer: manufactured by Kawasaki Kasei Chemicals., product number: 9,10-dibutoxyanthracene)

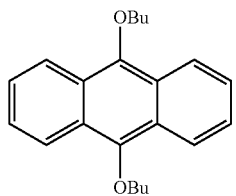

[[Basic Compound 1]]

A compound having the following structure (producer: manufactured by TOYOKASEI CO., LTD., product number: CMTU)

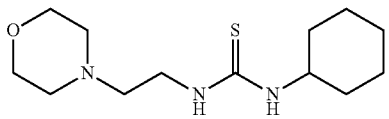 [SMILES: S=C(NCCN1CCOCC1)NC1CCCCC1]

[[Surfactant F-554]]

A perfluoroalkyl group-containing nonionic surfactant (manufactured by DIC Corporation) represented by the following structural formula.

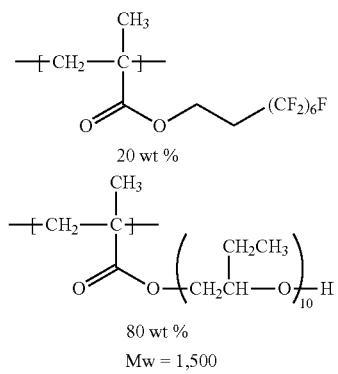

Formation of Second Region (ITO Pattern Layer)

Using a slit coater, the resist composition for ITO etching was uniformly applied to a substrate with an ITO layer, in which an ITO film having a refractive index of 1.8 and a film thickness of 0.7 μm was formed on a temporary polyethylene terephthalate (PET) support. The resist composition was dried at 80° C. for 60 seconds, and then exposed to light via a predetermined mask using an exposing machine PLA-501F (extra high pressure mercury lamp) manufactured by Canon Inc. The resist composition for etching after the exposure was developed with an alkali developer (2.38 mass % tetramethylammonium hydroxide aqueous solution) at 23° C. for 60 seconds, and then rinsed with ultrapure water for 20 seconds to obtain a thin wire pattern having a wire width of 0.5 μm (the space between thin wires was 0.3 μm). Thereafter, a post-baking heat treatment was performed at 140° C. for 3 minutes before the etching step.

The substrate with an ITO layer was immersed in an ITO etchant (3% oxalic acid aqueous solution) at 40° C. for 1 minute with the use of the resist pattern as a resist for etching (so-called mask) to perform ITO patterning by wet etching. Thereafter, the resist pattern was peeled by immersion in a resist peeling liquid (MS2001, manufactured by FUJIFILM Electronic Materials Co., Ltd.) at 70° C. for 7 minutes, and thus an ITO pattern layer having a wire width of 0.4 μm with an interval of 0.4 μm was formed such that the line-to-space ratio (hereinafter, referred to as L/S) was 1/1.

((Step of Forming First Region (Zirconia-Dispersed Refractive Index Layer))

—Preparation of Zirconia-Dispersed Refractive Index Layer Forming Composition—

[Preparation of Dispersion D1]

Components of a dispersion D1 having the following composition were blended, mixed with 17,000 parts by mass of zirconia beads (0.3 mmφ), and dispersed for 12 hours using a paint shaker. The zirconia beads (0.3 mmφ) were separated by filtration to obtain the dispersion D1.

| Dispersion D1 (parts by mass) | |
|---|---|
| Zirconium Dioxide (zirconia) (manufactured by Nissan Chemical Corporation, trade name: NANOUSE ZR, average primary particle diameter: 10 to 30 nm) | 1875 |
| DISPERBYK-111 (manufactured by BYK Additives & Instruments) 30% PGMEA Solution | 2200 |
| Solvent PGMEA | 3425 |

[Preparation of Zirconia-Dispersed Refractive Index Layer Forming Composition C1]

Components of the following refractive index layer forming composition were mixed to prepare a uniform solution, and then the solution was filtered using a polyethylene filter having a pore size of 0.2 μm to prepare a zirconia-dispersed refractive index layer forming composition C1.

| Zirconia-Dispersed Refractive Index Layer Forming Composition C1 (parts by mass) | |
|---|---|
| PGMEA | 100.0 |
| Dispersion D1 Described Above | 478.4 |
| Polymer E1 Described Below | 263.3 |
| Photo Acid Generator PAG-1 Having Structure Described Above | 5.1 |
| Photosensitizer 1 Having Structure Described Above | 5.1 |
| Basic Compound 1 Having Structure Described Above | 0.2 |
| Surfactant F-554 Having Structure Described Above | 0.2 |

[[Polymer E1]]

89 g of diethylene glycol methyl ethyl ether (MEDG: manufactured by TOHO Chemical Industry Co., Ltd.) was put into a three-necked flask, and the temperature was raised to 90° C. under a nitrogen atmosphere. To the above solution, 0.4 molar equivalent of 1-ethoxyethyl methacrylate (MAEVE: manufactured by FUJIFILM Wako Pure Chemical Corporation), 0.3 molar equivalent of glycidyl methacrylate (GMA: manufactured by FUJIFILM Wako Pure Chemical Corporation), 0.1 molar equivalent of methacrylic acid (MAA: manufactured by FUJIFILM Wako Pure Chemical Corporation), 0.2 molar equivalent of hydroxyethyl methacrylate (HEMA: manufactured by FUJIFILM Wako Pure Chemical Corporation), and V-65 (azo polymerization initiator; manufactured by FUJIFILM Wako Pure Chemical Corporation, equivalent to 4 mol % with respect to a total of 100 mol % of all monomer components) were dissolved, and the resulting mixture was added dropwise for 2 hours. After the dropwise addition was stopped, stirring was performed for 2 hours, and the reaction was stopped. Accordingly, a polymer E1 was obtained. The ratio of the content of MEDG to the content of other components was set to 60:40. That is, a polymer solution in which the concentration of solid contents was 40% was prepared.

—Formation of First Region (Zirconia-Dispersed Refractive Index Layer)—

The zirconia-dispersed refractive index layer forming composition C1 was uniformly applied to the ITO pattern layer of the temporary support with an ITO pattern layer obtained as above using a slit coater, and dried at 80° C. for 60 seconds. Then, the mask position was adjusted such that the composition C1 at a portion where the ITO layer was not formed was exposed using an exposing machine PLA-501F (extra high pressure mercury lamp) manufactured by Canon Inc., and exposure was performed via the mask. After the exposure, the composition C1 was developed with an alkali developer (0.4 mass % tetramethylammonium hydroxide aqueous solution) at 23° C. for 60 seconds, and then rinsed with ultrapure water for 20 seconds to obtain a substrate in which the ITO layer and the zirconia-dispersed refractive index layer were alternately arranged. Thereafter, a post-baking heat treatment was performed at 200° C. for 30 minutes. The film thickness of the finished zirconia-dispersed refractive index layer was 0.7 μm, the wire width was 0.4 μm, and the refractive index was 1.55.

An absolute phase adjustment layer in which the ITO layer (second region) having a refractive index of 1.8 and provided on the temporary support and the zirconia-dispersed refractive index layer (first region) having a refractive index of 1.55 were alternately arranged was bonded to the cholesteric liquid crystal layer provided on the glass substrate with a 1 μm thick pressure sensitive adhesive (SK DYNE 2057 manufactured by Soken Chemical & Engineering Co., Ltd.), and then the temporary support on which the absolute phase adjustment layer was formed was peeled to obtain an optical laminate of Example 1.

Example 2

A cholesteric liquid crystal layer was formed on a glass substrate in the same manner as in Example 1, ITO sputtering was performed on the cholesteric liquid crystal layer through room temperature sputtering to directly form a uniform ITO layer having a film thickness of 0.7 μm and a refractive index of 1.8 on the cholesteric liquid crystal layer, and then an ITO pattern layer having a wire width of 0.4 μm (L/S=1/1) was formed in the same manner as in the formation of Example 1. In a space portion of the ITO pattern layer, a zirconia-dispersed refractive index layer described in Example 1 was formed in the same manner as in Example 1. As a result, an optical laminate of Example 2 was obtained comprising the absolute phase adjustment layer which was directly provided on the cholesteric liquid crystal layer and in which the ITO pattern and the zirconia-dispersed refractive index layer (film thickness: 0.7 μm, wire width: 0.4 μm) were alternately arranged.

Example 3

A cholesteric liquid crystal layer was formed on a glass substrate in the same manner as in Example 1, and an absolute phase adjustment layer in which an ITO pattern layer and a zirconia-dispersed refractive index layer were alternately arranged was formed on a temporary support in the same manner as in Example 1. In this case, the wire width of the ITO pattern layer was set to 0.3 μm (L/S=1/1). Except for this, the process was performed in the same manner as in Example 1, and thus an optical laminate of Example 3 was obtained.

Example 4

In Example 2, the wire width of an ITO pattern layer was set to 0.3 μm (L/S=1/1). An optical laminate of Example 4 was formed in the same manner, except that the pattern period was 0.6 μm.

Example 5

A cholesteric liquid crystal layer was formed on a glass substrate in the same manner as in Example 1.

On a temporary support, a refractive index periodic pattern layer in which a first region was a zirconia-dispersed refractive index layer similar to that described above and a second region was formed of a titanium dioxide-dispersed refractive index layer was formed as an absolute phase adjustment layer. As in Examples 1 to 4, a striped periodic pattern layer of the first region and the second region was formed. The method of forming the absolute phase adjustment layer of this example was as follows.

(Formation of Absolute Phase Adjustment Layer)

(Formation of Second Region (Titanium Dioxide-Dispersed Refractive Index Layer))

[[Preparation of Dispersion D2]]

Components of a dispersion D2 having the following composition were blended, mixed with 17,000 parts by mass of zirconia beads (0.3 mmφ), and dispersed for 12 hours using a paint shaker. The zirconia beads (0.3 mmφ) were separated by filtration to obtain the dispersion D2.

| Dispersion D2 (parts by mass) | |
|---|---|
| Titanium Dioxide (manufactured by ISHIHARA SANGYO KAISHA, LTD., trade name: TTO-51 (A), average primary particle diameter: 10 to 30 nm) | 1875 |
| DISPERBYK-111 (manufactured by BYK Additives & Instruments) 30% PGMEA Solution | 2200 |
| Solvent PGMEA | 3425 |

[Preparation of Titanium Dioxide-Dispersed Refractive Index Layer Forming Composition C2]

Components of the following titanium dioxide-dispersed refractive index layer forming composition were mixed to prepare a uniform solution, and then the solution was filtered using a polyethylene filter having a pore size of 0.2 μm to prepare a titanium dioxide-dispersed refractive index layer forming composition C2.

| Titanium Dioxide-Dispersed Refractive Index Layer Forming Composition C2 (parts by mass) | |
|---|---|
| PGMEA | 100.0 |
| Dispersion D2 Described Above | 478.4 |
| Polymer E1 Described in Example 1 | 263.3 |
| Photo Acid Generator PAG-1 Described in Example 1 | 5.1 |
| Photosensitizer 1 Described in Example 1 | 5.1 |
| Basic Compound 1 Described in Example 1 | 0.2 |
| Surfactant F-554 Having Structure Described Above | 0.2 |

—Formation of Second Region (Titanium Dioxide-Dispersed Refractive Index Layer)—

Using a slit coater, the composition C2 was uniformly applied to a temporary PET support, and dried at 80° C. for 60 seconds. Then, exposure was performed via a predetermined mask using an exposing machine PLA-501F (extra high pressure mercury lamp) manufactured by Canon Inc. After the exposure, the composition C2 was developed with an alkali developer (0.4 mass % tetramethylammonium hydroxide aqueous solution) at 23° C. for 60 seconds, and then rinsed with ultrapure water for 20 seconds. After that, a post-baking heat treatment was performed at 200° C. for 30 minutes. The film thickness of the finished titanium dioxide-dispersed refractive index layer was 0.5 μm, the wire width was 0.3 μm, and the refractive index was 2.0.

—Formation of First Region (Zirconia-Dispersed Refractive Index Layer)—

A zirconia-dispersed refractive index layer forming composition C1 described in Example 1 was uniformly applied to the titanium dioxide-dispersed refractive index layer pattern on the temporary support obtained as above using a slit coater, and dried at 80° C. for 60 seconds. Then, the mask position was adjusted such that the composition C1 at a portion where the titanium dioxide-dispersed refractive index layer was not formed was exposed using an exposing machine PLA-501F (extra high pressure mercury lamp) manufactured by Canon Inc., and exposure was performed via the mask. After the exposure, the composition C1 was developed with an alkali developer (0.4 mass % tetramethylammonium hydroxide aqueous solution) at 23° C. for 60 seconds, and then rinsed with ultrapure water for 20 seconds to obtain a substrate in which the titanium dioxide-dispersed refractive index layer having a refractive index of 2.0 and the zirconia-dispersed refractive index layer were alternately arranged. Thereafter, a post-baking heat treatment was performed at 200° C. for 30 minutes. The film thickness of the finished zirconia-dispersed refractive index layer was 0.5 μm, the wire width was 0.3 μm, and the refractive index was 1.55.

An absolute phase adjustment layer thus obtained, in which the second region (titanium dioxide-dispersed refractive index layer) having a refractive index of 2.0 and the first region (zirconia-dispersed refractive index layer) having a refractive index of 1.55 were alternately arranged, was bonded to the cholesteric liquid crystal layer provided on the glass substrate with a 1 μm thick pressure sensitive adhesive, and then the temporary support on which the absolute phase adjustment layer was formed was peeled to obtain an optical laminate of Example 5.

Comparative Example 1

Comparative Example 1 was prepared in which a cholesteric liquid crystal layer was provided on the alignment film of the glass substrate with an alignment film formed in Example 1. That is, Comparative Example 1 is a reflective polarizer formed of a conventional wavelength selective reflective element comprising no absolute phase adjustment layer.

[Evaluation]

For each optical laminate, chromaticity based on integrated reflected light was measured from the surface side of the absolute phase adjustment layer from a direction normal to the surface (polar angle: 0°) and a direction inclined by 45° from the normal direction (polar angle: 45°), respectively, and a chromaticity difference (Δu'v') was obtained based on the value measured in the normal direction and the value measured in the direction inclined by 45° from the normal direction. Here, the alignment direction of the regions of the line pattern was defined as an azimuthal angle of 0°, and the measurement was performed at the azimuthal angle of 0°. An ultraviolet-visible-near infrared spectrophotometer V-700 manufactured by JASCO Corporation was used as a measurement machine.

The chromaticity difference was evaluated as follows. A is the most preferable level, and A to C are levels within an acceptable range. However, D represents s an unacceptable chromaticity difference.

A: 0.2 or smaller
B: Larger than 0.2 and not larger than 0.3
C: Larger than 0.3 and not larger than 0.5
D: Larger than 0.5

Table 1 collectively shows the configurations and evaluation results of the examples.

TABLE 1

| | | | | Comparative Example 1 | Example 1 | Example 2 | Example 3 | Example 4 | Example 5 |
|---|---|---|---|---|---|---|---|---|---|
| Configuration of Optical Laminate | Wavelength Selective Reflective Element | | | Cholesteric layer (λ c = 550 nm, 8 pitch) | Cholesteric layer (λ c = 550 nm, 8 pitch) | Cholesteric layer (λ c = 550 nm, 8 pitch) | Cholesteric layer (λ c = 550 nm, 8 pitch) | Cholesteric layer (λ c = 550 nm, 8 pitch) | Cholesteric layer (λ c = 550 nm, 8 pitch) |
| | Adhesion Layer (pressure sensitive adhesive) | | | — | Provided | None | Provided | None | Provided |
| | Absolute Phase Adjustment Layer | First Region A | Thickness $d_1$ (μm) | — | 0.7 | 0.7 | 0.7 | 0.7 | 0.5 |
| | | | Refractive Index $n_1$ | — | 1.55 | 1.55 | 1.55 | 1.55 | 1.55 |
| | | | Width $w_1$ (μm) | — | 0.4 | 0.4 | 0.3 | 0.3 | 0.3 |
| | | Second Region B | Thickness $d_2$ (μm) | — | 0.7 | 0.7 | 0.7 | 0.7 | 0.5 |
| | | | Refractive Index $n_2$ | — | 1.8 | 1.8 | 1.8 | 1.8 | 2.0 |
| | | | Width $w_2$ (μm) | — | 0.4 | 0.4 | 0.3 | 0.3 | 0.3 |
| | | Arrangement Period P (μm) | | | 0.8 | 0.8 | 0.6 | 0.6 | 0.6 |
| | | Optical Path Length Difference: $\|n_1 \times d_1 - n_2 \times d_2\|$ (μm) | | | 0.175 | 0.175 | 0.175 | 0.175 | 0.225 |
| Effect | Evaluation of Chromaticity Difference (Δu'v') of Integrated Reflected Light at Polar Angles of 0° and 45° | | | D | A | A | A | A | A |

As shown in Table 1, it is evident that in Comparative Example 1 comprising no absolute phase adjustment layer, the chromaticity difference is unacceptably large, but in Examples 1 to 5 comprising the absolute phase adjustment layer, the chromaticity difference is small, and color change according to the viewing angle is suppressed. Examples 1 and 2 are different from Example 3 and 4 in terms of the presence or absence of the pressure sensitive adhesive between the wavelength selective reflective element and the absolute phase adjustment layer, but the same effect was obtained in both cases.

Example 11

An optical laminate comprising a reflection layer formed of a dielectric multilayer film D1 as a wavelength selective reflective element was formed. The wavelength selective reflective element was formed with reference JP2000-508378A (JP-H11-508378A). Details thereof will be described below.
(Dielectric Multilayer Film D1)

Two types of aligned birefringent polymer layers were alternately laminated and biaxially stretched such that the in-plane refractive index differed between the two types of layers, and thus the dielectric multilayer film D1 was formed. The thickness of the dielectric multilayer film was set such that the optical path length, obtained by multiplying the thickness of each of the two types of aligned refractive index polymer layers by the refractive index of each of the layers, was equal to one quarter of a desired reflection wavelength (here, 550 nm). In the method of forming a dielectric multilayer film described in JP2000-508378A (JP-H11-508378A), uniaxial stretching was performed, but in this example, biaxial stretching was performed, and the refractive index of each layer was set to have no in-plane anisotropy. Of the two types of aligned refractive index polymers, the low refractive index layer had a refractive index set to 1.64, and the high refractive index layer had a refractive index set to 1.88. The thickness of the low refractive index layer was set to 83.8 nm, and the thickness of the high refractive index layer was set to 73.1 nm in order to allow the dielectric multilayer film to function as a reflection layer selectively reflecting a wavelength region having a central wavelength of 550 nm, and a film formed of a total of 256 layers was formed by alternately laminating 128 low refractive index layers and 128 high refractive index layers. In this manner, a reflection layer formed of the dielectric multilayer film D1 having a central wavelength of reflection of 550 nm and having a specific selective reflection region was formed. The half-width of the selective reflection region was about 80 nm.
(Absolute Phase Adjustment Layer)

The absolute phase adjustment layer was formed by the same forming method as in Example 1. The thicknesses, the refractive indices, and the arrangement periods of the first region A and the second region B, and the optical path length difference between the first region A and the second region B were all the same as those of the absolute phase adjustment layer of Example 1.

The absolute phase adjustment layer was bonded to the dielectric multilayer film D1 with a 1 μm thick pressure sensitive adhesive (SK DYNE 2057 manufactured by Soken Chemical & Engineering Co., Ltd.), and then the temporary support on which the absolute phase adjustment layer was formed was peeled to obtain an optical laminate of Example 11.

Example 12

A reflection layer formed of a dielectric multilayer film D1 was formed in the same manner as in Example 11, and an absolute phase adjustment layer similar to that of Example 3, in which an ITO pattern layer having a wire width of 0.3 μm (L/S=1/1) and a zirconia-dispersed refractive index layer were alternately arranged, was formed. The absolute phase adjustment layer was bonded to the dielectric multilayer film in the same manner as in Example 11 to obtain an optical laminate of Example 12.

Example 13

A reflection layer formed of a dielectric multilayer film D1 was formed in the same manner as in Example 11, and an absolute phase adjustment layer similar to that of Example 5, in which a first region (zirconia-dispersed refractive index layer) having a refractive index of 1.55 and a second region (titanium dioxide-dispersed refractive index layer) having a refractive index of 2.0 were alternately arranged was formed. The absolute phase adjustment layer was bonded to the dielectric multilayer film in the same manner as in Example 11 to obtain an optical laminate of Example 13.

Example 14

An optical laminate comprising a reflection layer formed of a dielectric multilayer film D2 as a wavelength selective reflective element was formed.
(Dielectric Multilayer Film D2)

Two types of aligned birefringent polymer layers were alternately laminated and uniaxially stretched, and thus the dielectric multilayer film D2 was formed. In this case, the thickness of the dielectric multilayer film was set such that the two types of aligned refractive index polymer layers had substantially the same refractive index in one in-plane direction (for example, x-axis), and had different refractive indices in a direction orthogonal to the above direction (for example, y-axis), and the optical path length, obtained by multiplying the thickness of each of the layers by the refractive index in the y-axis direction, was equal to one quarter of a desired reflection wavelength (here, 550 nm). In this example, a configuration similar to those of FIGS. 1 and 2 of JP2000-508378A (JP-H11-508378A), in which specific linearly polarized light was selectively polarized and reflected was provided by uniaxial stretching according to the method of forming a dielectric multilayer film described in JP2000-508378A (JP-H11-508378A). The thickness of the low refractive index layer was set to 83.8 nm, and the thickness of the high refractive index layer was set to 73.1 nm in order to allow the dielectric multilayer film to function as a reflection layer selectively reflecting a wavelength region having a central wavelength of 550 nm, and a film formed of a total of 256 layers was formed by alternately laminating 128 low refractive index layers and 128 high refractive index layers. In this manner, a reflection layer formed of the dielectric multilayer film D2 having a central wavelength of reflection of 550 nm, having a specific selective reflection region, and reflecting specific linearly polarized light was formed. The half-width was about 80 nm.
(Absolute Phase Adjustment Layer)

The absolute phase adjustment layer was formed by the same forming method as in Example 1. The thicknesses, the refractive indices, and the arrangement periods of the first region A and the second region B, and the optical path length difference between the first region A and the second region B were all the same as those of the absolute phase adjustment layer of Example 1.

The absolute phase adjustment layer was bonded to the dielectric multilayer film D2 with a 1 μm thick pressure sensitive adhesive (SK DYNE 2057 manufactured by Soken Chemical & Engineering Co., Ltd.), and then the temporary support on which the absolute phase adjustment layer was formed was peeled to obtain an optical laminate of Example 14.

Comparative Example 11

A wavelength selective reflective element formed of a dielectric multilayer film D1 formed in Example 11 was provided as Comparative Example 11. That is, Comparative Example 11 is formed only of the wavelength selective reflective element without comprising an absolute phase adjustment layer.

Regarding Examples 11 to 14 and Comparative Example 11, evaluation was performed in the same manner as in Example 1. Table 2 collectively shows the configurations and evaluation results of the examples.

reflective element was formed. Using the same materials and methods as in Example 1, a cholesteric liquid crystal layer was formed on an alignment layer provided on a glass substrate. Then, a separately prepared absolute phase adjustment layer was bonded to the cholesteric liquid crystal layer to form the optical laminate of Example 21.

(Formation of Absolute Phase Adjustment Layer)

On a temporary support, an absolute phase adjustment layer in which a first region was formed of fluorinated acrylate and a second region was formed of a hardened layer of a resin for imprint LUMIPLUS LPS-1130 (manufactured by Mitsubishi Gas Chemical Company, Inc.) was formed. The first region A and the second region B were formed in a checker pattern shown in FIG. 14. Each region was a square 0.5 μm on a side ($=w_1=w_2$), and an arrangement period P was 1 μm.

—Formation of Second Region—

A resin for imprint LUMIPLUS LPS-1130 (manufactured by Mitsubishi Gas Chemical Company, Inc.) was applied to a temporary PET support, and a silicon mold for imprint having checker pattern-like unevenness (manufactured by Kyodo International, Inc.) was pressed thereagainst. In that state, UV exposure (5,000 mJ) was performed from the back

TABLE 2

| | | | Comparative Example 11 | Example 11 | Example 12 | Example 13 | Example 14 |
|---|---|---|---|---|---|---|---|
| Configuration of Optical Laminate | Wavelength Selective Reflective Element | | Dielectric multilayer film D1 | Dielectric multilayer film D1 | Dielectric multilayer film D1 | Dielectric multilayer film D1 | Dielectric multilayer film D2 |
| | Adhesion Layer (pressure sensitive adhesive) | | — | Provided | Provided | Provided | Provided |
| | Absolute Phase Adjustment Layer | First Region A | Thickness $d_1$ (μm) | — | 0.7 | 0.7 | 0.5 | 0.7 |
| | | | Refractive Index $n_1$ | — | 1.55 | 1.55 | 1.55 | 1.55 |
| | | | Width $w_1$ (μm) | — | 0.4 | 0.3 | 0.3 | 0.4 |
| | | Second Region B | Thickness $d_2$ (μm) | — | 0.7 | 0.7 | 0.5 | 0.7 |
| | | | Refractive Index $n_2$ | — | 1.8 | 1.8 | 2.0 | 1.8 |
| | | | Width $w_2$ (μm) | — | 0.4 | 0.3 | 0.3 | 0.4 |
| | | Arrangement Period P (μm) | | — | 0.8 | 0.6 | 0.6 | 0.8 |
| | | Optical Path Length Difference: $\| n_1 \times d_1 - n_2 \times d_2 \|$ (μm) | | | 0.175 | 0.175 | 0.225 | 0.175 |
| Effect | Evaluation of Chromaticity Difference (Δu′v′) of Integrated Reflected Light at Polar Angles of 0° and 45° | | | D | A | A | A | A |

As shown in Table 2, it is evident that in Comparative Example 11 comprising no absolute phase adjustment layer, the chromaticity difference is unacceptably large, but in Examples 11 to 14 comprising the absolute phase adjustment layer, the chromaticity difference is small, and color change according to the viewing angle is suppressed. Substantially the same results as those of Comparative Example 1 and Examples 1 to 5 shown in Table 1 were obtained.

In the above-described examples and comparative examples, the first region and the second region were provided in a line pattern in the absolute phase adjustment layer. Hereinafter, examples related to various patterns will be prepared, and verification results of the development of the effect in an azimuthal angle direction will be described.

Example 21

An optical laminate comprising a reflection layer formed of a cholesteric liquid crystal layer as a wavelength selective surface side of the temporary PET support to cure the resin, and the pressed silicon mold was peeled. Accordingly, a pattern of the second region having a thickness of 0.7 μm was formed on the PET substrate. Due to this imprinting, first, a pattern of a high refractive index layer L in the cross-sectional view of FIG. 14 is formed. The refractive index n of the second region is 1.69.

—Formation of First Region—

To the temporary support on which the pattern of the second region was formed, a coating liquid obtained by preparing the following composition was applied by spin coating. In this case, the rotation speed was adjusted so as to obtain the same film thickness (0.7 μm) as the second region. The liquid was dried at 60° C. for 3 minutes, and then UV-exposed (100 mJ). Accordingly, spaces between regions represented by L in the cross-sectional view of FIG. 14 were filled with fluorinated acrylate, and a low refractive index layer F was formed.

| Composition (parts by mass) | |
|---|---|
| MEK | 60 |
| IRGACURE 184 | 2 |
| Fluorinated Acrylate Having Following Structural Formula | 38 |

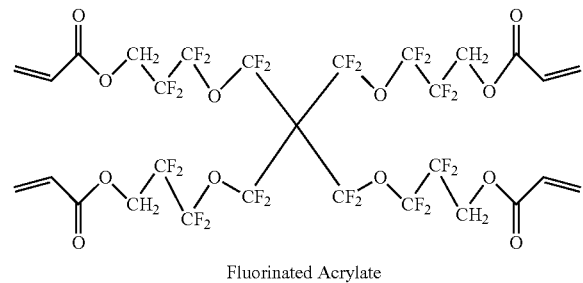

Fluorinated Acrylate

An absolute phase adjustment layer thus obtained, having a checker pattern of the first region A and the second region B as shown in FIG. 14, was bonded to the cholesteric liquid crystal layer provided on the glass substrate with a 1 μm thick pressure sensitive adhesive, and then the temporary support on which the absolute phase adjustment layer was formed was peeled to obtain an optical laminate of Example 21.

Examples 22 and 23

Optical laminates of Examples 22 to 32 were obtained in the same manner as in Example 21, except that the silicon mold for imprint was changed.

In forming a pattern provided with a third region or a pattern provided with a third region and a fourth region, a mold provided such that the thickness of a high refractive index layer to be formed by a resin for imprint was gradually reduced stepwise in the second region, third region, and fourth region was used.

Example 22 comprises an absolute phase adjustment layer in which a first region A, a second region B, and a third region C are arranged in the checker pattern shown in FIG. 15. As shown in the cross-sectional view (lower view) of FIG. 15, a stepwise low refractive index layer L is formed by imprint, and then a coating liquid is spin-coated to fill the recesses with a high refractive index layer F to form first to third regions. The third region C is a region where the low refractive index layer L and the high refractive index layer F are laminated. In Table 3 to be described below, in the item of refractive index $n_3$ related to the third region C, the low refractive index layer L formed earlier on the temporary support is positioned at the bottom, the high refractive index layer F formed later is positioned at the top, and the thicknesses and the refractive indices thereof are given together.

Similarly, Example 23 comprises an absolute phase adjustment layer in which a first region A, a second region B, a third region C, and a fourth region D are arranged in the checker pattern shown in FIG. 16. As shown in the cross-sectional view (lower view) of FIG. 16, a stepwise low refractive index layer L is formed by imprint, and then a coating liquid is spin-coated to fill the recesses with a high refractive index layer F to form first to fourth regions. The third region C and the fourth region D are regions where the low refractive index layer L and the high refractive index layer F are laminated, but are different from each other in terms of the thickness ratio between the low refractive index layer and the high refractive index layer. In Table 3, in the item of refractive index $n_4$ related to the fourth region, the low refractive index layer L formed earlier is positioned at the bottom, the high refractive index layer F formed later is positioned at the top, and the thicknesses and the refractive indices thereof are given together.

Examples 24 to 32 are the same as Examples 22 and 23, except that the checker pattern is a brick pattern (FIG. 17 or 18) or a honeycomb pattern (FIG. 19 or 20), and the thicknesses of the high refractive index layer and the low refractive index layer are as shown in the following Table 4.

[Evaluation]

For each of the optical laminates of Comparative Example 1 and Examples 1 to 5 and 21 to 32, chromaticity based on integrated reflected light was measured from the surface side of the absolute phase adjustment layer from a direction normal to the surface (polar angle: 0°) and a direction inclined by 45° from the normal direction (polar angle: 45°), respectively, and a chromaticity difference (Δu'v') was obtained based on the value measured in the normal direction and the value measured in the direction inclined by 45° from the normal direction. An ultraviolet-visible-near infrared spectrophotometer V-700 manufactured by JASCO Corporation was used as a measurement machine. The measurement was performed at azimuthal angles of 0°, 45°, and 90°. The chromaticity difference in a case where the azimuthal angle was 0° was evaluated in the same manner as in Tables 1 and 2. In the line patterns of Comparative Example 1 and Examples 1 to 5, an azimuthal angle of 0° was taken as the alternate arrangement direction of the first region and the second region. In the patterns of Examples 21 to 31 shown in FIGS. 14 to 20, the vertical direction in FIGS. 14 to 20 was defined as an azimuthal angle of 0°.

A difference between the maximum value and the minimum value of the chromaticity differences obtained at three azimuthal angles was represented by d, and the difference d between the chromaticity differences obtained at different azimuthal angles was evaluated as follows.

A: 0.2 or smaller
B: Larger than 0.2 and not larger than 0.3
C: Larger than 0.3 and not larger than 0.5
D: Larger than 0.5

Tables 3 and 4 collectively show the configurations and evaluation results of the absolute phase adjustment layers of the examples.

TABLE 3

| | | | Comparative Example 1 | Example 1 | Example 2 | Example 3 | Example 4 | Example 5 |
|---|---|---|---|---|---|---|---|---|
| Absolute Phase Adjustment Layer | First Region A | Thickness $d_1$ (μm) | — | 0.7 | 0.7 | 0.7 | 0.7 | 0.5 |
| | | Refractive Index $n_1$ | — | 1.55 | 1.55 | 1.55 | 1.55 | 1.55 |
| | | Width $w_1$ (μm) | — | 0.4 | 0.4 | 0.3 | 0.3 | 0.3 |

TABLE 3-continued

|  |  |  |  |  |  |  |  |  |
|---|---|---|---|---|---|---|---|---|
|  | Second Region B | Thickness $d_2$ (μm) | — | 0.7 | 0.7 | 0.7 | 0.7 | 0.5 |
|  |  | Refractive Index $n_2$ | — | 1.8 | 1.8 | 1.8 | 1.8 | 2 |
|  |  | Width $w_2$ (μm) | — | 0.4 | 0.4 | 0.3 | 0.3 | 0.3 |
|  | Third Region C | Thickness $d_3$ (μm) | — | — | — | — | — | — |
|  |  | Refractive Index $n_3$ | — | — | — | — | — | — |
|  |  | Width $w_3$ (μm) | — | — | — | — | — | — |
|  | Fourth Region D | Thickness $d_4$ (μm) | — | — | — | — | — | — |
|  |  | Refractive Index $n_4$ | — | — | — | — | — | — |
|  |  | Width $w_4$ (μm) | — | — | — | — | — | — |
|  | Arrangement Period P (μm) |  | — | 0.8 | 0.8 | 0.6 | 0.6 | 0.6 |
|  | Pattern Design |  | — | Line | Line | Line | Line | Line |
|  | Optical Path Length Difference: $\| n_1 \times d_1 - n_2 \times d_2 \|$ (μm) |  | — | 0.175 | 0.175 | 0.175 | 0.175 | 0.225 |
| Effect | Evaluation of Chromaticity Difference Δu'v' at Polar Angles of 0° and 45°: azimuthal angle 0° |  | D | A | A | A | A | A |
|  | Evaluation of Chromaticity Difference Δu'v' at Azimuthal angles 0°, 45°, and 90° |  | A | D | D | D | D | D |

|  |  |  | Example 21 | Example 22 | Example 23 | Example 24 | Example 25 |
|---|---|---|---|---|---|---|---|
| Absolute Phase Adjustment Layer | First Region A | Thickness $d_1$ (μm) | 0.7 | 0.7 | 0.9 | 0.7 | 0.9 |
|  |  | Refractive Index $n_1$ | 1.45 | 1.45 | 1.45 | 1.45 | 1.45 |
|  |  | Width $w_1$ (μm) | 0.5 | 0.5 | 0.5 | 0.5 | 0.5 |
|  | Second Region B | Thickness $d_2$ (μm) | 0.7 | 0.7 | 0.9 | 0.7 | 0.9 |
|  |  | Refractive Index $n_2$ | 1.69 | 1.69 | 1.69 | 1.69 | 1.69 |
|  |  | Width $w_2$ (μm) | 0.5 | 0.5 | 0.5 | 0.5 | 0.5 |
|  | Third Region C | Thickness $d_3$ (μm) | — | 0.7 | 0.9 | 0.7 | 0.9 |
|  |  | Refractive Index $n_3$ | — | Top: 0.35 μm/1.45 Bottom: 0.35 μm/1.69 | Top: 0.3 μm/1.45 Bottom: 0.6 μm/1.69 | Top: 0.35 μm/1.45 Bottom: 0.35 μm/1.69 | Top: 0.3 μm/1.45 Bottom: 0.6 μm/1.69 |
|  |  | Width $w_3$ (μm) | — | 0.5 | 0.5 | 0.5 | 0.5 |
|  | Fourth Region D | Thickness $d_4$ (μm) | — | — | 0.9 | — | 0.9 |
|  |  | Refractive Index $n_4$ | — | — | Top: 0.6 μm/1.45 Bottom: 0.3 μm/1.69 | — | Top: 0.6 μm/1.45 Bottom: 0.3 μm/1.69 |
|  |  | Width $w_4$ (μm) | — | — | 0.5 | — | 0.5 |
|  | Arrangement Period P (μm) |  | 1.0 | 1.5 | 2.0 | 1.5 | 2.0 |
|  | Pattern Design |  | Checker (FIG. 14) | Checker (FIG. 15) | Checker (FIG. 16) | Brick (FIG. 17) | Brick (FIG. 18) |
|  | Optical Path Length Difference: $\| n_1 \times d_1 - n_2 \times d_2 \|$ (μm) |  | 0.168 | 0.168 | 1.168 | 0.168 | 0.168 |
| Effect | Evaluation of Chromaticity Difference Δu'v' at Polar Angles of 0° and 45°: azimuthal angle 0° |  | A | A | A | A | A |
|  | Evaluation of Chromaticity Difference Δu'v' at Azimuthal angles 0°, 45°, and 90° |  | C | A | A | A | A |

TABLE 4

|  |  |  | Example 26 | Example 27 | Example 28 | Example 29 | Example 30 | Example 31 | Example 32 |
|---|---|---|---|---|---|---|---|---|---|
| Absolute Phase Adjustment Layer | First Region A | Thickness $d_1$ (µm) | 0.7 | 0.7 | 1.0 | 1.0 | 1.0 | 0.5 | 0.9 |
|  |  | Refractive Index $n_1$ | 1.45 | 1.45 | 1.45 | 1.45 | 1.45 | 1.45 | 1.45 |
|  |  | Width $w_1$ (µm) | 0.5 | 0.4 | 0.5 | 0.5 | 0.5 | 0.5 | 0.5 |
|  | Second Region B | Thickness $d_2$ (µm) | 0.7 | 0.7 | 1 | 1 | 1 | 0.5 | 0.9 |
|  |  | Refractive Index $n_2$ | 1.69 | 1.69 | 1.69 | 1.69 | 1.69 | 1.69 | 1.69 |
|  |  | Width $w_2$ (µm) | 0.5 | 0.4 | 0.5 | 0.5 | 0.5 | 0.5 | 0.5 |
|  | Third Region C | Thickness $d_3$ (µm) | 0.7 | 0.7 | 1.0 | 1.0 | 1.0 | 0.5 | 0.9 |
|  |  | Refractive Index $n_3$ | Top: 0.35 µm/1.45 Bottom: 0.35 µm/1.69 | Top: 0.35 µm/1.45 Bottom: 0.35 µm/1.69 | Top: 0.5 µm/1.45 Bottom: 0.5 µm/1.69 | Top: 0.3 µm/1.45 Bottom: 0.7 µm/1.69 | Top: 0.7 µm/1.45 Bottom: 0.3 µm/1.69 | Top: 0.25 µm/1.45 Bottom: 0.25 µm/1.69 | Top: 0.3 µm/1.45 Bottom: 0.6 µm/1.69 |
|  |  | Width $w_3$ (µm) | 0.5 | 0.4 | 0.5 | 0.5 | 0.5 | 0.5 | 0.5 |
|  | Fourth Region D | Thickness $d_4$ (µm) | — | — | — | — | — | — | 0.9 |
|  |  | Refractive Index $n_4$ | — | — | — | — | — | — | Top: 0.6 µm/1.45 Bottom: 0.3 µm/1.69 |
|  |  | Width $w_4$ (µm) | — | — | — | — | — | — | 0.5 |
|  |  | Arrangement Period P (µm) | 1.5 | 1.2 | 1.5 | 1.5 | 1.5 | 1.5 | 2.0 |
|  |  | Pattern Design | Honeycomb (FIG. 19) | Honeycomb (FIG. 19) | Honeycomb (FIG. 19) | Honeycomb (FIG. 19) | Honeycomb (FIG. 19) | Honeycomb (FIG. 19) | Honeycomb (FIG. 20) |
|  |  | Optical Path Length Difference: $\lvert n_1 \times d_1 - n_2 \times d_2 \rvert$ (µm) | 0.168 | 0.168 | 0.24 | 0.24 | 0.24 | 0.12 | 0.168 |
| Effect |  | Evaluation of Chromaticity Difference Δu'v' at Polar Angles of 0° and 45°: azimuthal angle 0° | A | A | A | A | A | B | A |
|  |  | Evaluation of Chromaticity Difference Δu'v' at Azimuthal angles 0°, 45°, and 90° | A | A | A | A | A | B | A |

As shown in Tables 3 and 4, in Examples 22 to 32 comprising the third region, or the third region and the fourth region, the dependency of the chromaticity difference on the azimuthal angle was small, and thus an effect of suppressing the chromaticity difference was obtained even during visual recognition from various directions, as compared to Examples 1 to 5 and 21 in which the pattern included only the first region and the second region.

EXPLANATION OF REFERENCES

10, 10R, 10G, 10B, 20, 30, 40, 50, 110: optical laminate
12, 12R, 12G, 12B, 32, 42: wavelength selective reflective element (cholesteric liquid crystal layer)
14: absolute phase adjustment layer
14a to 14g: refractive index layer
22: support
24: alignment layer
28: diffusion plate
52: adhesion layer
112: wavelength selective reflective element (dielectric multilayer film)
112H: high refractive index layer
112L: low refractive index layer

What is claimed is:

1. An optical laminate comprising:
  a wavelength selective reflective element which is provided with a reflection layer selectively reflecting light in a specific reflection wavelength region; and
  an absolute phase adjustment layer which is provided on at least one surface side of the wavelength selective reflective element and has optical isotropy, and in which a first region having a first optical thickness and a second region having a second optical thickness different from the first optical thickness are arranged in a pattern with a diffraction grating-like period, and
  wherein the optical laminate reflects light in the specific reflection wavelength region by the wavelength selective reflective element, of light incident from the absolute phase adjustment layer side, and
  light which enters the first region and is reflected by the wavelength selective reflective element and light which enters the second region and is reflected by the wavelength selective reflective element interfere with each other,
  wherein in the wavelength selective reflective element, two or more reflection layers having different reflection wavelength regions are arranged in a pattern with a larger period than the period, and
  wherein interface between the reflective element and the absolute phase adjustment layer is flat, the interface covers the first and the second optical thicknesses.

2. The optical laminate according to claim 1,
  wherein the reflection layer of the wavelength selective reflective element is formed of a cholesteric liquid crystal layer.

3. The optical laminate according to claim 1,
  wherein the reflection layer of the wavelength selective reflective element is formed of a dielectric multilayer film in which at least two layers having different refractive indices are alternately laminated in multiple layers.

4. The optical laminate according to claim 1, wherein the first region and the second region of the absolute phase adjustment layer are different from each other in at least one of a refractive index or a film thickness.

5. The optical laminate according to claim 1, wherein an optical thickness difference between the first optical thickness and the second optical thickness is 0.27λ to 0.45λ where λ is a central wavelength of the specific reflection wavelength region.

6. The optical laminate according to claim 1, wherein the period of the pattern is 0.6 μm to 2.0 μm.

7. The optical laminate according to claim 1, wherein the first region has a refractive index of 1.4 to 1.6, and the second region has a refractive index of 1.8 to 2.0.

8. The optical laminate according to claim 1, wherein a diffusion plate is provided on a surface side of the absolute phase adjustment layer, opposed to a surface on which the wavelength selective reflective element is disposed.

9. The optical laminate according to claim 1, wherein the first region and the second region have the same stripe shape, and are alternately arranged in a width direction of the stripe shape.

10. The optical laminate according to claim 1, wherein the first region and the second region have the same rectangular shape, and are alternately arranged in horizontal and vertical directions.

11. The optical laminate according to claim 1, wherein the absolute phase adjustment layer is provided with an intermediate region having an optical thickness between the first optical thickness and the second optical thickness, and the intermediate region is arranged together with the first region and the second region in the pattern with the period.

12. The optical laminate according to claim 1, wherein the wavelength selective reflective element is formed by laminating two or more reflection layers having different reflection wavelength regions.

13. An optical laminate which is formed by laminating the optical laminate according to claim 1 in multiple layers.

* * * * *